US012755648B2

(12) United States Patent
Eggert et al.

(10) Patent No.: US 12,755,648 B2
(45) Date of Patent: *Oct. 6, 2026

(54) AUGMENTED REALITY SYSTEM FOR TEACHING PATIENT CARE

(71) Applicant: Gaumard Scientific Company, Inc., Miami, FL (US)

(72) Inventors: John S. Eggert, Miami, FL (US); Sindy Giraldo, Miami, FL (US); Alberto Rodriguez, Miami, FL (US); David Isaza, Miami, FL (US); Christopher Marcus Clapp, Miami, FL (US); Ramakrishna Voorakaranam, Miami, FL (US)

(73) Assignee: Gaumard Scientific Company, Inc., Miami, FL (US)

( * ) Notice: Subject to any disclaimer, the term of this patent is extended or adjusted under 35 U.S.C. 154(b) by 667 days.

This patent is subject to a terminal disclaimer.

(21) Appl. No.: 18/062,209

(22) Filed: Dec. 6, 2022

(65) Prior Publication Data

US 2023/0094004 A1 Mar. 30, 2023

Related U.S. Application Data

(63) Continuation of application No. 15/998,676, filed on Aug. 16, 2018, now Pat. No. 11,551,578.

(Continued)

(51) Int. Cl.

*G09B 23/28* (2006.01)
*G06T 19/00* (2011.01)

(Continued)

(52) U.S. Cl.

CPC ............ *G09B 23/28* (2013.01); *G06T 19/003* (2013.01); *G06T 19/006* (2013.01); *G09B 5/06* (2013.01);

(Continued)

(58) Field of Classification Search

CPC ................................................ G09B 23/30–34

(Continued)

(56) References Cited

U.S. PATENT DOCUMENTS

| | | | | | |
|---|---|---|---|---|---|
| 2004/0254771 | A1* | 12/2004 | Riener | .................. | G09B 23/32 703/7 |
| 2007/0122785 | A1* | 5/2007 | Eggert | .................. | G16Z 99/00 434/272 |

(Continued)

OTHER PUBLICATIONS

Examination Report issued by the European Patent Office for related European Patent Application No. 23183152.0, dated May 13, 2024, 5 pages.

(Continued)

*Primary Examiner* — Thomas J Hong

(74) *Attorney, Agent, or Firm* — HAYNES AND BOONE, LLP

(57) ABSTRACT

An augmented reality system including: a physical anatomic model; a display unit via which a user is adapted to receive first and second optic feedbacks, the first optic feedback emanating from the physical anatomic model and passing through the display unit, and the second optic feedback emanating from the display unit and including a virtual anatomic model; a tracking system adapted to track a position and orientation of the display unit; and a computing device adapted to: receive a first signal from the tracking system relating to the position and orientation of the display unit, and send a second signal to cause the display unit to overlay the second optic feedback on the first optic feedback, the second signal being based on the first signal. In some embodiments, the second optic feedback further includes ancillary virtual graphics such as medical data, instructional steps, expert demonstrations, didactic content, and exigent circumstances.

21 Claims, 27 Drawing Sheets

Related U.S. Application Data

(60) Provisional application No. 62/546,130, filed on Aug. 16, 2017.

(51) Int. Cl.
*G09B 5/06* (2006.01)
*G09B 5/14* (2006.01)
*G09B 7/00* (2006.01)

(52) U.S. Cl.
CPC ................ *G09B 5/14* (2013.01); *G09B 7/00* (2013.01); *G09B 23/281* (2013.01); *G06T 2219/2016* (2013.01)

(58) Field of Classification Search
USPC .......................................................... 434/267
See application file for complete search history.

(56) References Cited

U.S. PATENT DOCUMENTS

2009/0148822 A1 6/2009 Eggert et al.
2010/0159434 A1 6/2010 Lampotang et al.
2010/0304347 A1 12/2010 Eggert et al.
2012/0280988 A1* 11/2012 Lampotang .......... G09B 23/285 434/262
2013/0189663 A1 7/2013 Tuchschmid et al.
2017/0110032 A1 4/2017 O'Brien et al.
2017/0213473 A1 7/2017 Ribeira et al.
2017/0221387 A1 8/2017 Lampotang et al.

OTHER PUBLICATIONS

Extended European Search Report for related European Patent Application No. 23183152, mailed Aug. 16, 2023; 8 pages.

International Search Report and Written Opinion received in Patent Cooperation Treaty Application No. PCT/US2018/000154, dated Nov. 15, 2018, 7 pages.

European Patent Office, Extended European Search Report dated Mar. 17, 2021 from related Application No. 18845597.6, 9 pages.

Gaumard Scientific: "Gaumard Victoria S2200 How-To Video Series," YouTube, May 4, 2017, p. 1, retrieved from the Internet, URL: https://www.youtube.com/watch?v=DbEuv4GH080 [retrieved on Mar. 8, 2021].

Office Action for corresponding Chinese Patent Application No. 2018800675997, dated Jun. 3, 2021; 9 pages.

* cited by examiner

Animation and Rendering Process in Obstetric AR

Translation and Rotation of the Baby as it Progresses Though the Birthing Process

(A)-(C) :Using Animation Software, Fetus Pre-animated with Only Translation but no Rotation Animation (e.g. Maya, Blender)

(D)-(E) :Desired Rotation Created in Real-Time Using Gaming Software by rotating the Pre-animated Models (e.g. Unity 3D)

Animation of Fetus Rotations

Video Recording with holographic overlay of AR Images

AUGMENTED REALITY SYSTEM FOR TEACHING PATIENT CARE

CROSS-REFERENCE TO RELATED APPLICATIONS

This application is a continuation of U.S. patent application Ser. No. 15/998,676, filed Aug. 16, 2018, which claims the benefit of the filing date of, and priority to, U.S. patent application No. 62/546,130, filed Aug. 16, 2017, the entire disclosures of which are hereby incorporated herein by reference.

TECHNICAL FIELD

This disclosure is related in general to systems for teaching patient care, and, more particularly, to an augmented reality system for teaching patient care.

BACKGROUND

As medical science has progressed, it has become increasingly important to provide non-human interactive formats for teaching patient care. While it is desirable to train medical personnel in patient care protocols before allowing contact with real patients, textbooks and flash cards lack the important benefits to students that can be attained from hands-on practice. On the other hand, allowing inexperienced students to perform medical procedures on actual patients that would allow for the hands-on practice cannot be considered a viable alternative because of the inherent risk to the patient. Non-human interactive devices and systems can be used to teach the skills needed to successfully identify and treat various patient conditions without putting actual patients at risk.

For example, patient care education has often been taught using medical instruments to perform patient care activity on a physical simulator, such as a manikin. Such training devices and systems can be used by medical personnel and medical students to teach and assess competencies such as patient care, medical knowledge, practice based learning and improvement, systems based practice, professionalism, and communication. The training devices and systems can also be used by patients to learn the proper way to perform self-examinations. "In situ" simulation in healthcare is popular because it uses a real patient simulator in a real hospital environment. As a result, students are allowed to practice and make mistakes in the same area where they may later treat real life patients in a professional manner. However, one issue with this approach is that such facilities may be jammed with real patients and caregivers thus simulation time becomes limited.

The internal structure, functions, and processes of existing physical simulators are not visible by the user. In addition, at least some desirable external features are not present on the physical simulator or are poorly simulated by existing simulators. To address these issues, some physical simulators incorporate physically simulated fluids and physical disposables for a variety of treatment scenarios. However, physically simulated fluids have the potential of causing the physical simulator's electronics to short-circuit. Furthermore, physical disposables have a limited life-span, and are not amenable to anatomic variability on a large scale. Thus, while existing physical simulators have been adequate in many respects, they have not been adequate in all respects. Therefore, what is needed is an augmented reality system for use in conducting patient care training sessions that is even more realistic and/or includes additional simulated features.

DETAILED DESCRIPTION

Figure 1:
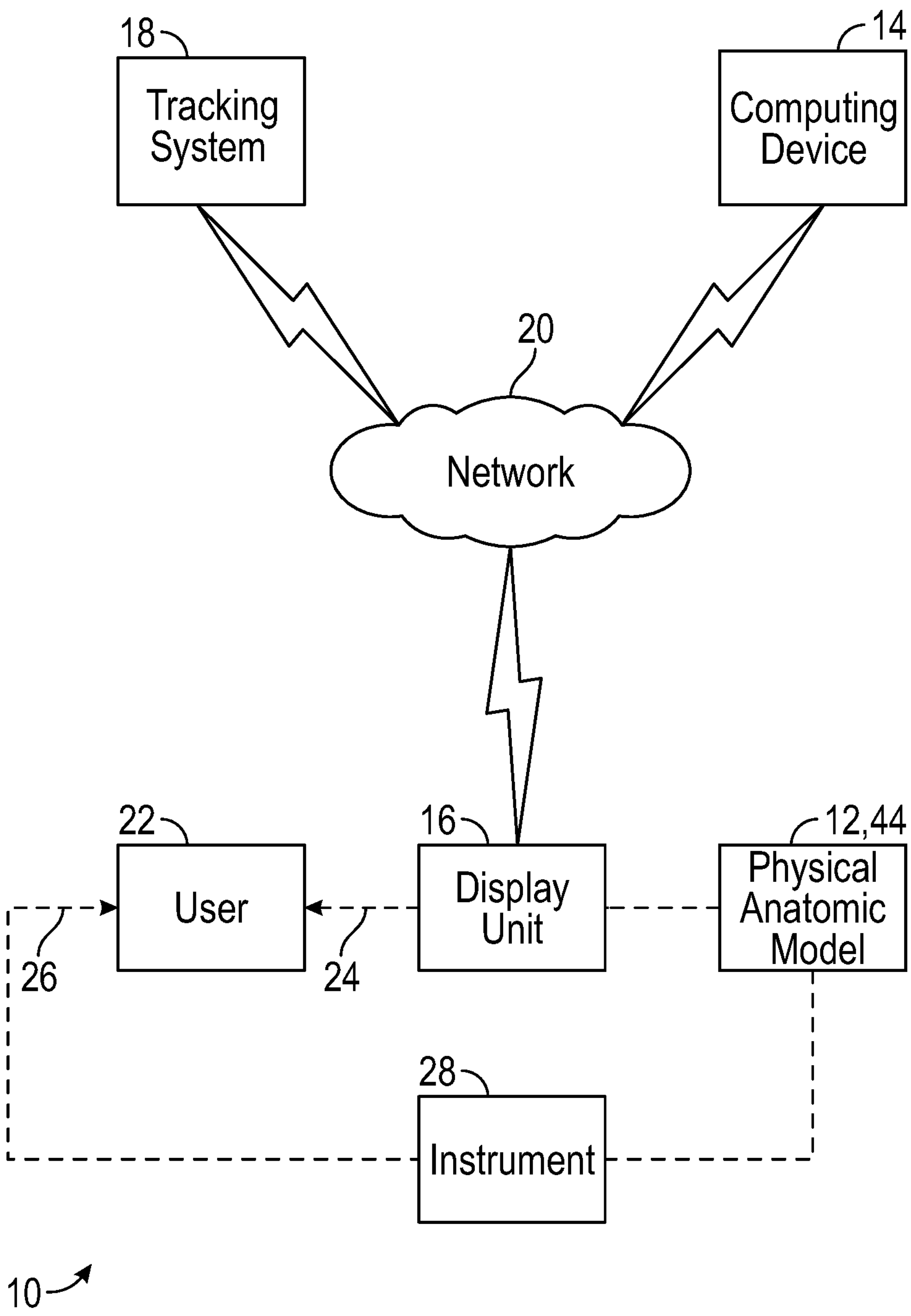
FIG. 1 is a diagrammatic illustration of an augmented reality system according to one or more embodiments of the present disclosure.

For the purposes of promoting an understanding of the principles of the present disclosure, reference will now be made to the embodiments illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately. For simplicity, in some instances the same reference numbers are used throughout the drawings to refer to the same or like parts.

One of the aims of healthcare simulation is to establish a teaching environment that closely mimics key clinical cases in a reproducible manner. The introduction of high fidelity tetherless simulators, such as those available from Gaumard Scientific Company, Inc., over the past few years has proven to be a significant advance in creating realistic teaching environments. The present disclosure is directed to an augmented reality ("AR") system for teaching patient care that expands the functionality of the simulators by increasing the realism of the look, feel, and functionality of the simulators that can be used to train medical personnel in a variety of clinical situations. The AR system disclosed herein offers a training platform on which team-building scenarios can be performed for the development of medical treatment skills and the advancement of patient safety.

In particular, the AR system disclosed herein may include, or be part of, a patient simulator to provide improved realism and functionality compared to previously available simulators. Some of the various features that facilitate the improved realism and functionality are described in detail below. The AR system of the present disclosure allows users to practice a range of different scenarios.

Thus, the AR system facilitates the training of a user across a broad range of simulated scenarios and corresponding assessment of the user's response to the different simulated scenarios. Accordingly, the user's medical treatment skills can be obtained and/or improved in a simulated environment without endangering a live patient.

Moreover, the AR system allows for multiple users to simultaneously work with the patient simulator during a particular birthing and/or neonatal scenario, thereby facilitating team training and assessment in a realistic, team-based environment. By allowing multiple users to simultaneously interact with the AR system, the system facilitates the real-time training and assessment of the cooperative efforts of a team in a wide variety of scenarios, such as, by way of non-limiting example, a fire in the hospital. In some embodiments, the AR system provides for pre-operative care simulation as well as post-operative care simulation, thereby allowing users to experience, address, and assess pre-operative and post-operative management, including pre-operative acquisition of the patient history and management of post-operative complications.

For example, in some embodiments, the AR system allows for the realistic reception and transport of the patient simulator through a hospital (e.g., from an emergency room to an operating room) during operation of a particular scenario. In addition, the AR system can be used to conduct patient safety drills in an actual hospital or other medical setting.

In some embodiments, the AR system includes features designed to enhance the educational experience. For example, in some embodiments, the system includes a processing module to simulate different medical and/or surgical scenarios during operation of the AR system. In some embodiments, the system includes a camera system that allows visualization of the procedure for real-time video and log capture for debriefing purposes. In some embodiments, the AR system is provided with a workbook of medical scenarios that are pre-programmed in an interactive software package, thereby providing a platform on which team-building scenarios can be performed for the development of medical treatment skills and general patient safety. Thus, the AR system disclosed herein provides a system that is readily expandable and updatable without large expense and that enables users to learn comprehensive medical and surgical skills through "hands-on" training, without sacrificing the experience gained by users in using standard surgical instruments in a simulated patient treatment situation.

The present disclosure introduces AR applications wherein a virtual world, static or dynamic, is superimposed onto a real physical simulator so that when the student(s) have AR headset devices, they will see both the real simulator and the virtual overlay in a manner which will improve the rate of learning. Going a step further, augmented reality can be viewed as a series of overlays. For example, a basic environment (which could be a hospital ER for example) is recorded on an AR headset device (such as Hololens® from Microsoft®). Avatars may then be placed into this base environment, including people such as nurses, doctors, and significant others who may move and speak during a particular scenario. Moreover, a physical or virtual simulator may be placed in this base environment. As a result, student(s) will feel as though they have also been placed within the base environment together with the physical or virtual simulator, and may treat the physical or virtual simulator as appropriate. The student(s)' choice of activities and their results may then be recorded to memorialize clinical competency.

Referring initially to FIG. 1, an AR system for teaching patient care is generally referred to by the reference numeral 10. The AR system 10 includes a physical anatomic model 12, a computing device 14, a display unit 16, and a tracking system 18. The computing device 14, the display unit 16, and the tracking system 18 are connected to a network 20 (e.g., LAN or WAN). In addition, or instead, the computing device 14, the display unit 16, and the tracking system 18 may be interconnected via another wired or wireless link. As shown in FIG. 1, a user 22 receives optic feedback from the physical anatomic model 12 through the display unit 16, as indicated by the arrow 24. In addition, the user 22 receives haptic feedback from the physical anatomic model 12 via direct physical contact, as indicated by the arrow 26. In some embodiments, the AR system 10 further includes an instrument 28 via which the user 22 physically interacts with the physical anatomic model 12, such as, for example, motion-tracked gloves, an IV needle, an endotracheal (ET) tube, an electrocardiogram (ECG or EKG) monitor, a blood pressure (BP) cuff, a pulse oximeter cuff, a temporary external pacer, an automatic external defibrillator (AED), a manual defibrillator, an ultrasound wand, a stethoscope, a thermometer, a fetal distress monitor, another diagnostic or surgical instrument, or any combination thereof.

The display unit 16 is wearable by the user 22, and is thus also referred to herein as an AR headset device 16. In addition, or instead, the display unit 16 may be handheld or mounted in a stationary position. Accordingly, each embodiment described herein as including the AR headset device 16 is equally operable with another suitable display unit, such as a handheld display unit or a display unit mounted in a stationary position. In some embodiments, to permit the user 22's receipt of the optic feedback 24 from the physical anatomic model 12 via the AR headset device 16, the AR headset device 16 includes a transparent (or semi-transparent) lens (not shown). In some embodiments, to permit the user 22's receipt of the optic feedback 24 from the physical anatomic model 12 via the AR headset device 16, the AR headset device 16 includes a screen (not shown) and an integrated camera (not shown) that captures footage of the physical anatomic model 12 to display on the screen in real-time. In some embodiments, the AR headset device 16 includes, or is part of, at least a portion of the tracking system 18 and/or the computing device 14. Alternatively, the AR headset device 16 may include an onboard computing device separate from, but substantially similar to, the computing device 14 to run an AR application locally on the AR headset device 16, as will be described in further detail below.

The tracking system 18 tracks the position and orientation of the AR headset device 16 in three-dimensional space and relative to the physical anatomic model 12. In some embodiments, the tracking system 18 tracks the position and orientation of the AR headset device 16 with six degrees-of-freedom ("6-DoF"), including x, y, and z coordinates of the AR headset device 16, and pitch, yaw, and roll of the AR headset device 16. The tracking system 18 may be any suitable type of tracking system capable of tracking the position and orientation of the AR headset device 16 (e.g., tracking fiducial markers, using stereo images to track retro-reflective infrared markers, employing electromagnetic tracker(s), etc.). In some embodiments, at least a portion of the tracking system 18 includes, or is part of, the AR headset device 16 and/or the computing device 14. The tracking system 18 can include sensors embedded in the AR headset device 16, including without limitation gyroscope(s), accelerometer(s), GPS sensor(s), and/or combinations thereof. A holographic rendering of the physical world (e.g., a 3D mesh model of the physical world) can be utilized to coordinate the virtual positioning to the physical world. For example, a holographic computer and head-mounted display, such as the Hololens® available from Microsoft®, may be used to provide a holographic unit to render virtual objects in the physical world.

The computing device 14 is capable of receiving, via the network 20, signals from the tracking system 18 relating to the position and orientation of the AR headset device 16. Moreover, based on the signals received from the tracking system 18, the computing device 14 is capable of sending, via the network 20, appropriate signals to the AR headset device 16 to augment or otherwise enhance the user 22's view of the physical anatomic model 12, as will be discussed in further detail below. In some embodiments, the computing device 14 includes, or is part of, the AR headset device 16 and/or at least a portion of the tracking system 18.

Figure 2:
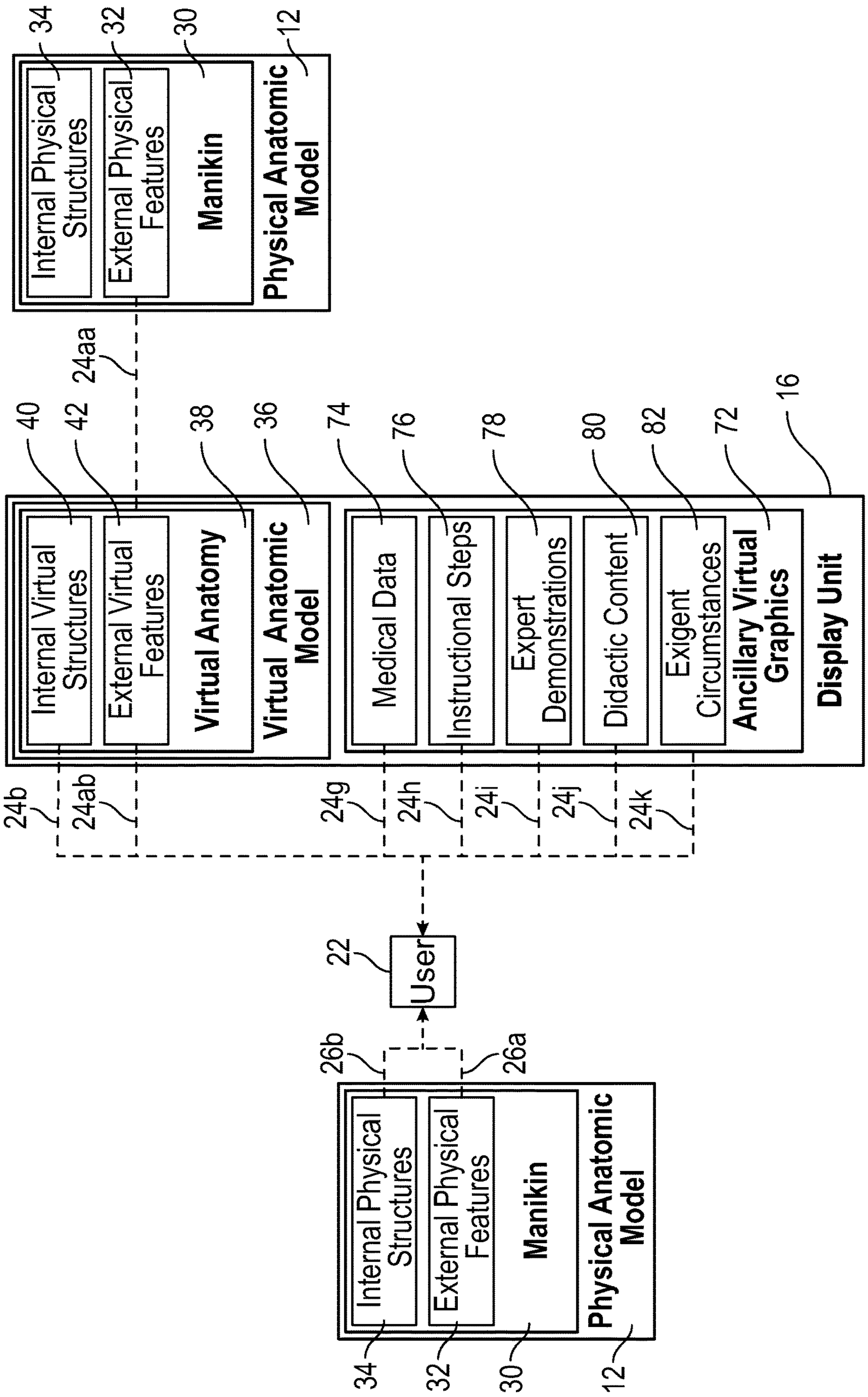
FIG. 2 is a diagrammatic illustration of a user of the augmented reality system of FIG. 1 receiving optic feedback from a first virtual anatomic model, and receiving both optic and haptic feedback from a first physical anatomic model according to one or more embodiments of the present disclosure.

Turning to FIG. 2, the physical anatomic model 12 includes a manikin 30. The manikin 30 includes external physical features 32. The external physical features 32 of the manikin 30 may include, for example, physical representations of one or more external characteristics associated with a natural human's torso, legs, arms, head, or any combination thereof; such external physical features 32 of the manikin 30 provide both optic feedback (as indicated by the arrow **24*aa* in FIG. 2) and haptic feedback (as indicated by the arrow 26*a* in FIG. 2) to the user 22. More particularly, the optic feedback 24*aa* received by the user 22 emanates from the manikin 30 and passes through the AR headset device 16. In some embodiments, the manikin 30 also includes internal physical structures 34. The internal physical structures 34 of the manikin 30 may include physical representations of one or more internal characteristics associated with the natural human's torso, such as, for example, the spine, the ribs, the heart, the lungs, the liver, another internal characteristic of the natural human's torso, or any combination thereof. In addition, or instead, the internal physical structures 34 of the manikin 30 may include, for example, physical representations of one or more internal characteristics associated with the natural human's legs, arms, head, or any combination thereof. The internal physical structures 34 of the manikin 30 provide haptic feedback (as indicated by the arrow 26***b* in FIG. 2), and not optic feedback, to the user 22. The internal physical structures 34 can include female reproductive system, cardiovascular system associated with venous/arterial access, central nervous system associated with lumbar puncture, major organs and distinctive representations based on simulated scenario (e.g., healthy lungs vs. lungs affected with COPD, organs squashed during pregnancy, removing a gall stone endoscopically, etc.). The external physical structures 32 can include scars, skin anomalies, distinctive skin marks, skin discoloration, cyanosis, wounds, etc.

To augment or otherwise enhance the user 22's view of the physical anatomic model 12, a virtual anatomic model 36 is overlaid on the user 22's view of the physical anatomic model 12 via the AR headset device 16. More particularly, the virtual anatomic model 36 is displayed on the AR headset device 16 within the user 22's field of view so that the user 22 simultaneously views both the physical anatomic model 12 and the virtual anatomic model 36. The virtual anatomic model 36 is stored on, or accessible by, the computing device 14. In addition to the virtual anatomic model 36, a plurality of virtual anatomic models (not shown) may be stored on, or accessible by, the computing device 14 to simulate a wide variety of anatomies and pathologies encountered during the particular procedure being trained for. In some embodiments, the physical anatomic model 12 and the virtual anatomic model 36, in combination, represent characteristics of the natural human. The virtual anatomic model 36 includes virtual anatomy 38.

The virtual anatomy 38 includes internal virtual structures 40. The internal virtual features 40 of the virtual anatomy 38 may include virtual representations of one or more internal characteristics associated with the natural human's torso, such as, for example, the spine, the ribs, the heart, the lungs, the liver, another internal characteristic of the natural human's torso, or any combination thereof. In addition, or instead, the internal virtual features 40 of the virtual anatomy 38 may include, for example, virtual representations of one or more internal characteristics associated with the natural human's legs, arms, head, or any combination thereof. The internal virtual features 40 of the virtual anatomy 38 provide optic feedback (as indicated by the arrow 24*b* in FIG. 2), and not haptic feedback, to the user 22. The internal virtual features 40 can include aspects of the female reproductive system, cardiovascular system associated with venous/arterial access, central nervous system associated with lumbar puncture, major organs and distinctive representations based on simulated scenario (e.g., healthy lungs vs. lungs affected with COPD, organs squashed during pregnancy, removing a gall stone endoscopically, etc.).

In some embodiments, the virtual anatomy 38 also includes external virtual features 42 that provide enhanced photorealism to the user 22's view of the manikin 30's external physical features 32. The external virtual features 42 of the virtual anatomy 38 may include, for example, virtual representations of one or more external characteristics associated with the natural human's torso, legs, arms, head, or any combination thereof; such external virtual features 42 of the virtual anatomy 38 provide optic feedback (as indicated by the arrow 24*ab* in FIG. 2), and not haptic feedback, to the user 22. In some embodiments, the virtual anatomy 38 is co-registered (using the computing device 14) with the manikin 30 so that the internal virtual structures 40 and the external virtual features 42 of the virtual anatomy 38 have an accurate spatial relationship with the internal physical structures 34 and the external physical features 32, respectively, of the manikin 30. The external virtual features 42 can include aspects of scars, skin anomalies, distinctive skin marks, skin discoloration, cyanosis, wounds, etc.

The external physical features 32 of the manikin 30 and the external virtual features 42 of the virtual anatomy 38 are configurable to realistically simulate the external characteristics associated with the natural human by providing the user 22 with an appropriate combination of optic and haptic feedback (as indicated by the arrows 24*aa*, 24*ab*, and 26*a*, respectively, in FIG. 2). To this end, the external physical features 32 of the manikin 30 may simulate some external characteristics associated with the natural human while other external characteristics associated with the natural human are simulated by the external virtual features 42 of the virtual anatomy 38; in addition, or instead, one or more external characteristics associated with the natural human may be simulated by both the external physical features 32 of the manikin 30 and the external virtual features 42 of the virtual anatomy 38.

The internal physical structures 34 of the manikin 30 and the internal virtual structures 40 of the virtual anatomy 38 are configurable to realistically simulate the internal characteristics associated with the natural human by providing the user 22 with an appropriate combination of optic and haptic feedback (as indicated by the arrows 24*b* and 26*b*, respectively, in FIG. 2). To this end, the internal physical structures 34 of the manikin 30 may simulate some internal characteristics associated with the natural human while other internal characteristics associated with the natural human are simulated by the internal virtual structures 40 of the virtual anatomy 38; in addition, or instead, one or more internal characteristics associated with the natural human may be simulated by both the internal physical structures 34 of the manikin 30 and the internal virtual structures 40 of the virtual anatomy 38.

In operation, the virtual anatomic model 36 and the physical anatomic model 12 illustrated in FIG. 2, in combination, provide a training platform for simulating, inter alia, proper tracheostomy procedures (including insertion of a trachea tube), proper pneumothorax procedures, wound hemorrhaging (including proper application of packing pressure as well as, alternatively, proper implementation of an adequate tourniquet at a site suitable to stop the wound(s) from further blood loss), proper treatment of lesions or lacerations caused by battle, combat, explosion, trauma, other diagnostic, treatment, or surgical scenarios, including birthing and obstetrics procedures, or any combination thereof. During these simulations, the external physical features 32 of the manikin 30 are visible to the user 22, but the internal physical structures 34 of the manikin 30 are not visible to the user 22. The tracking system 18 tracks the position and orientation of the AR headset device 16 and the computing device 14 receives, via the network 20, signals from the tracking system 18 relating to the position and orientation of the AR headset device 16. The computing device 14 sends, via the network 20, appropriate signals to the AR headset device 16 to overlay the virtual anatomic model 36 (including the virtual anatomy 38) on the physical anatomic model 12. As a result, the AR headset device 16 accurately overlays the virtual anatomy 38 on the user 22's view of the manikin 30.

Figure 3:
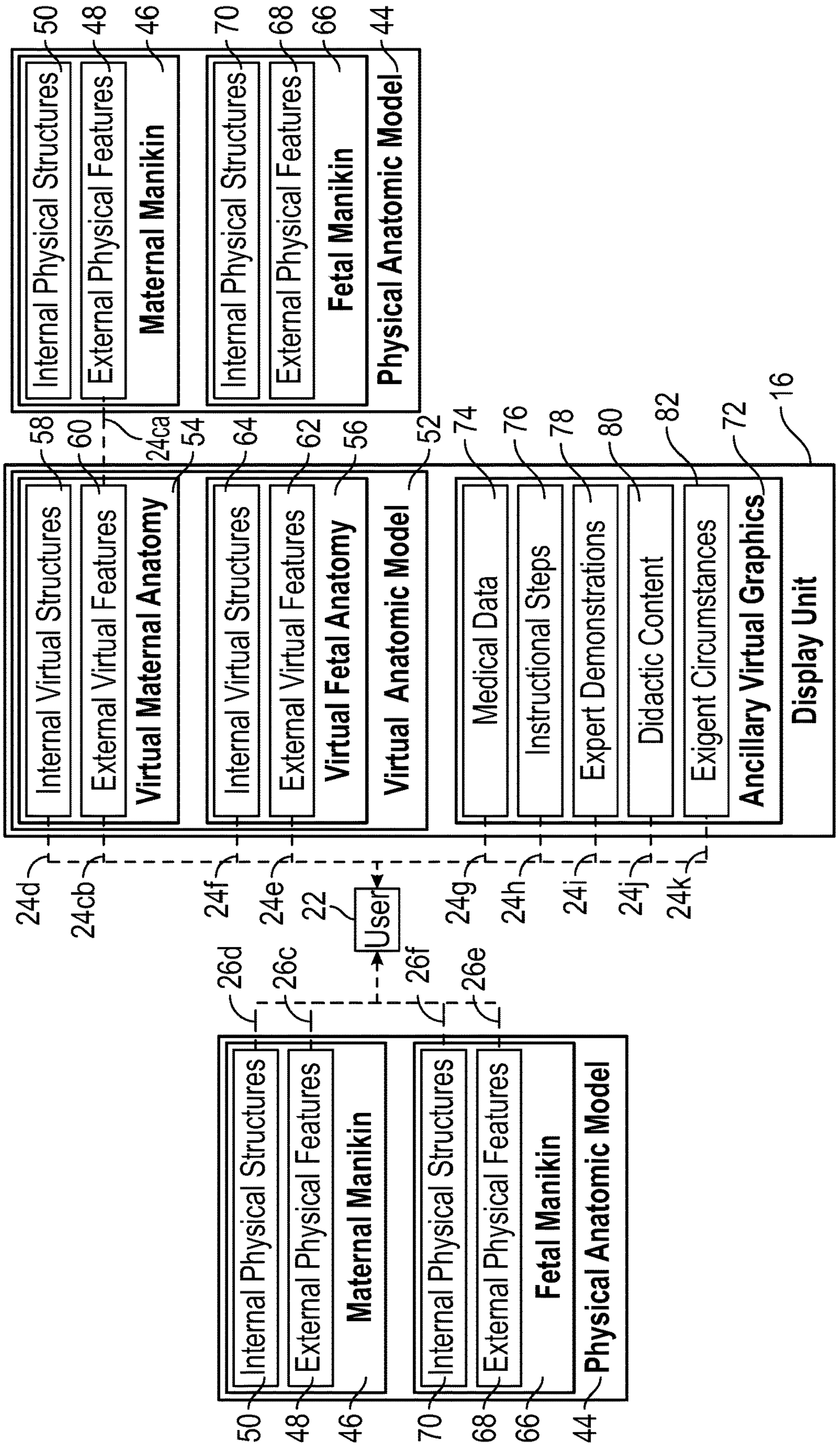
FIG. 3 is a diagrammatic illustration is a diagrammatic illustration of a user of the augmented reality system of FIG. 1 receiving optic feedback from a second virtual anatomic model, and receiving both optic and haptic feedback from a second physical anatomic model according to one or more embodiments of the present disclosure.

Turning to FIG. 3, in an example embodiment, the physical anatomic model 12 is omitted and replaced with a physical anatomic model 44. The physical anatomic model 44 includes a maternal manikin 46. The maternal manikin 46 includes external physical features 48. The external physical features 48 of the maternal manikin 46 may include, for example, physical representations of one or more external characteristics associated with a natural mother's torso, legs, arms, head, or any combination thereof; such external physical features 48 of the maternal manikin 46 provide both optic feedback (as indicated by the arrow 24*ca* in FIG. 3) and haptic feedback (as indicated by the arrow 26*c* in FIG. 3) to the user 22. More particularly, the optic feedback 24*ca* received by the user 22 emanates from the maternal manikin 46 and passes through the AR headset device 16. In some embodiments, the maternal manikin 46 also includes internal physical structures 50. The internal physical structures 50 of the maternal manikin 46 may include physical representations of one or more internal characteristics associated with the natural mother's torso, such as, for example, the spine, the ribs, the pubic bone, the uterus, the cervix, another internal characteristic of the natural mother's torso, or any combination thereof. In addition, or instead, the internal physical structures 50 of the maternal manikin 46 may include, for example, physical representations of one or more internal characteristics associated with the natural mother's legs, arms, head, or any combination thereof. The internal physical structures 50 of the maternal manikin 46 provide haptic feedback (as indicated by the arrow 26*d* in FIG. 3), and not optic feedback, to the user 22. The internal physical structures 50 can include female reproductive system, cardiovascular system associated with venous/arterial access, central nervous system associated with lumbar puncture, major organs and distinctive representations based on simulated scenario (e.g., healthy lungs vs. lungs affected with COPD, organs squashed during pregnancy, removing a gall stone endoscopically, etc.). The external physical features 48 can include scars, skin anomalies, distinctive skin marks, skin discoloration, cyanosis, wounds, etc.

To augment or otherwise enhance the user 22's view of the physical anatomic model 44, a virtual anatomic model 52 is overlaid on the user 22's view of the physical anatomic model 44 using the AR headset device 16. More particularly, the virtual anatomic model 52 is displayed on the AR headset device 16 within the user 22's field of view so that the user 22 simultaneously views both the physical anatomic model 44 and the virtual anatomic model 52. The virtual anatomic model 52 is stored on, or accessible by, the computing device 14. In addition to the virtual anatomic model 52, a plurality of virtual anatomic models (not shown) may be stored on, or accessible by, the computing device 14 to simulate a wide variety of anatomies and pathologies encountered during the particular procedure being trained for. In some embodiments, the physical anatomic model 44 and the virtual anatomic model 52, in combination, represent characteristics of, and interactions between, the natural mother and a natural fetus. The virtual anatomic model 52 includes virtual maternal anatomy 54 and virtual fetal anatomy 56.

The virtual maternal anatomy 54 includes internal virtual structures 58. The internal virtual structures 58 of the virtual maternal anatomy 54 may include virtual representations of one or more internal characteristics associated with the natural mother's torso, such as, for example, the spine, the ribs, the pubic bone, the uterus, the cervix, another internal characteristic of the natural mother's torso, or any combination thereof. In addition, or instead, the internal virtual structures 58 of the virtual maternal anatomy 54 may include, for example, virtual representations of one or more internal characteristics associated with the natural mother's legs, arms, head, or any combination thereof. The internal virtual structures 58 of the virtual maternal anatomy 54 provide optic feedback (as indicated by the arrow 24*d* in FIG. 3), and not haptic feedback, to the user 22. The internal virtual structures 58 can include aspects of the female reproductive system, cardiovascular system associated with venous/arterial access, central nervous system associated with lumbar puncture, major organs and distinctive representations based on simulated scenario (e.g., healthy lungs vs. lungs affected with COPD, organs squashed during pregnancy, removing a gall stone endoscopically, etc.).

In some embodiments, the virtual maternal anatomy 54 also includes external virtual features 60 that provide enhanced photorealism to the user 22's view of the maternal manikin 46's external physical features 48. The external virtual features 60 of the virtual maternal anatomy 54 may include, for example, virtual representations of one or more external characteristics associated with the natural mother's torso, legs, arms, head, or any combination thereof; such external virtual features 60 of the virtual maternal anatomy 54 provide optic feedback (as indicated by the arrow 24*cb* in FIG. 3), and not haptic feedback, to the user 22. The external virtual structures 60 can include scars, skin anomalies, distinctive skin marks, skin discoloration, cyanosis, wounds, etc.

The external physical features 48 of the maternal manikin 46 and the external virtual features 60 of the virtual maternal anatomy 54 are configurable to realistically simulate the external characteristics associated with the natural mother by providing the user 22 with an appropriate combination of optic and haptic feedback (as indicated by the arrows 24*ca*, 24*cb*, and 26*c*, respectively, in FIG. 3). To this end, the external physical features 48 of the maternal manikin 46 may simulate some external characteristics associated with the natural mother while other external characteristics associated with the natural mother are simulated by the external virtual features 60 of the virtual maternal anatomy 54; in addition, or instead, one or more external characteristics associated with the natural mother may be simulated by both the external physical features 48 of the maternal manikin 46 and the external virtual features 60 of the virtual maternal anatomy 54.

The internal physical structures 50 of the maternal manikin 46 and the internal virtual structures 58 of the virtual maternal anatomy 54 are configurable to realistically simulate the internal characteristics associated with the natural mother by providing the user 22 with an appropriate combination of optic and haptic feedback (as indicated by the arrows 24*d* and 26*d*, respectively, in FIG. 3). To this end, the internal physical structures 50 of the maternal manikin 46 may simulate some internal characteristics associated with the natural mother while other internal characteristics associated with the natural mother are simulated by the internal virtual structures 58 of the virtual maternal anatomy 54; in addition, or instead, one or more internal characteristics associated with the natural mother may be simulated by both the internal physical structures 50 of the maternal manikin 46 and the internal virtual structures 58 of the virtual maternal anatomy 54.

The virtual fetal anatomy 56 includes external virtual features 62. The external virtual features 62 of the virtual fetal anatomy 56 may include, for example, virtual representations of one or more external characteristics associated with the natural fetus' torso, legs, arms, head, or any combination thereof. In addition, the external virtual features 62 of the virtual fetal anatomy 56 may include, for example, virtual representations of the natural fetus' amniotic sac, placenta, umbilical cord, or any combination thereof. The external virtual features 62 of the virtual fetal anatomy 56 provide optic feedback (as indicated by the arrow 24*e* in FIG. 3), and not haptic feedback, to the user 22. In some embodiments, the virtual fetal anatomy 56 also includes internal virtual structures 64 to enhance training for, e.g., intrauterine fetal procedure(s). The internal virtual structures 64 of the virtual fetal anatomy 56 may include, for example, virtual representations of internal characteristics associated with the natural fetus' torso, legs, arm, head, or any combination thereof; such internal virtual structures 64 of the virtual fetal anatomy 56 provide optic feedback (as indicated by the arrow 24*f* in FIG. 3), and not haptic feedback, to the user 22.

The AR system 10's physical anatomic model 44 further includes a fetal manikin 66 contained within the maternal manikin 46. The fetal manikin 66 includes external physical features 68. The external physical features 68 of the fetal manikin 66 may include, for example, physical representations of one or more external characteristics associated with the natural fetus' torso, legs, arms, head, or any combination thereof. In addition, the external physical features 68 of the fetal manikin 66 may include, for example, physical representations of the natural fetus' amniotic sac, placenta, umbilical cord, or any combination thereof. As a result of the fetal manikin 66's containment within the maternal manikin 46, the external physical features 68 of the fetal manikin 66 provide haptic feedback (as indicated by the arrow 26*e* in FIG. 3), and not optic feedback, to the user 22. In some embodiments, the fetal manikin 66 also includes internal physical structures 70 to enhance training for, e.g., intrauterine fetal procedure(s). The internal physical structures 70 of the fetal manikin 66 may include, for example, physical representations of one or more internal characteristics associated with the natural fetus' torso, legs, arms, head, or any combination thereof; such internal physical structures 70 of the fetal manikin 66 provide haptic feedback (as indicated by the arrow 26*f* in FIG. 3), and not optic feedback, to the user 22.

The external physical features 68 of the fetal manikin 66 and the external virtual features 62 of the virtual fetal anatomy 56 are configurable to realistically simulate the external characteristics associated with the natural fetus by providing the user 22 with an appropriate combination of optic and haptic feedback (as indicated by the arrows 24*e* and 26*e*, respectively, in FIG. 3). To this end, the external physical features 68 of the fetal manikin 66 may simulate some external characteristics associated with the natural fetus while other external characteristics associated with the natural fetus are simulated by the external virtual features 62 of the virtual fetal anatomy 56; in addition, or instead, one or more external characteristics associated with the natural fetus may be simulated by both the external physical features 68 of the fetal manikin 66 and the external virtual features 62 of the virtual fetal anatomy 56.

The internal physical structures 70 of the fetal manikin 66 and the internal virtual structures 64 of the virtual fetal anatomy 56 are configurable to realistically simulate the internal characteristics associated with the natural fetus by providing the user 22 with an appropriate combination of optic and haptic feedback (as indicated by the arrows 24*f* and 26*f*, respectively, in FIG. 3). To this end, the internal physical structures 70 of the fetal manikin 66 may simulate some internal characteristics associated with the natural fetus while other internal characteristics associated with the natural fetus are simulated by the internal virtual structures 64 of the virtual fetal anatomy 56; in addition, or instead, one or more internal characteristics associated with the natural fetus may be simulated by both the internal physical structures 70 of the fetal manikin 66 and the internal virtual structures 64 of the virtual fetal anatomy 56.

In some embodiments, in addition to tracking the position and orientation of the AR headset device 16, the tracking system 18 is capable of tracking the position and orientation of the fetal manikin 66 in three-dimensional space and relative to the maternal manikin 46. In some embodiments, the tracking system 18 tracks the position and orientation of the fetal manikin 66 with six degrees-of-freedom ("6-DoF"), including x, y, and z coordinates of the fetal manikin 66, and pitch, yaw, and roll of the fetal manikin 66. The tracking system 18 may be any suitable type of tracking system capable of tracking the position and orientation of the fetal manikin 66 (e.g., tracking fiducial markers, using stereo images to track retro-reflective infrared markers, employing electromagnetic tracker(s), etc.). In some embodiments, at least a portion of the tracking system 18 includes, or is part of, the fetal manikin 66. Accordingly, in addition to receiving, via the network 20, signals from the tracking system 18 relating to the position and orientation of the AR headset device 16, the computing device 14 is capable of receiving, via the network 20, signals from the tracking system 18 relating to the position and orientation of the fetal manikin 66. In some instances, the tracking system tracks the position and orientation of the fetal manikin 66 relative to the maternal manikin 46 using one or more trackable markers (e.g., physical, infrared, RFID, electromagnetic, etc.) placed on (or in) the fetal manikin and computer vision (e.g., using a suitable camera or other tracking mechanism for the type or marker(s)). In some instances, the tracking system tracks the position and orientation of the fetal manikin 66 relative to the maternal manikin 46 using feedback from the maternal manikin 46 regarding a position of a birthing mechanism of the maternal manikin 46 that defines the position and orientation of the fetal manikin.

In some embodiments, the virtual maternal anatomy 54 is co-registered (using the computing device 14) with the maternal manikin 46 so that the internal virtual structures 58 and the external virtual features 60 of the virtual maternal anatomy 54 have an accurate spatial relationship with the internal physical structures 50 and the external physical features 48, respectively, of the maternal manikin 46. Similarly, in some embodiments, the virtual fetal anatomy 56 is co-registered (using the computing device 14) with the maternal manikin so that the external virtual features 62 and the internal virtual structures 64 of the virtual fetal anatomy 56 have an accurate spatial relationship with the maternal manikin 46. In addition, or instead, in some embodiments, the virtual fetal anatomy 56 is co-registered (using the computing device 14) with the fetal manikin 66 so that the external virtual features 62 and the internal virtual structures 64 of the virtual fetal anatomy 56 have an accurate spatial relationship with the external physical features 68 and the internal physical structures 70, respectively, of the fetal manikin 66. In some instances, the co-registration is accomplished by saving a spatial mapping of the physical environment and assigning anchors to the real world. Further, in some instances, user defined placement of the virtual anatomy on the physical manikin can be used, alone or with the spatial mapping, to facilitate the co-registration.

In operation, the virtual anatomic model 52 and the physical anatomic model 44 illustrated in FIG. 3, in combination, provide a training platform for simulating, inter alia, routine gestational palpation of the natural fetus, Leopold's Maneuvers to determine the position of the natural fetus inside the natural mother's uterus, an external cephalic version to turn the natural fetus from a breech position or side-lying (transverse) position into a head-down (vertex) position before labor begins, one or more intrauterine fetal procedure(s), true-to-life shoulder dystocia, breech, and C-section deliveries, other diagnostic, treatment, or surgical scenarios, including birthing and obstetrics procedures, or any combination thereof. During these simulations, the external physical features 48 of the maternal manikin 46 are visible to the user 22, but the fetal manikin 66 and the internal physical structures 50 of the maternal manikin 46 are not visible to the user 22. The tracking system 18 tracks the position and orientation of the AR headset device 16 and the computing device 14 receives, via the network 20, signals from the tracking system 18 relating to the position and orientation of the AR headset device 16. In addition, the tracking system 18 tracks the position and orientation of the fetal manikin 66 relative to the maternal manikin 46, and the computing device 14 receives, via the network 20, signals from the tracking system 18 relating to the position and orientation of the fetal manikin 66. The computing device 14 sends, via the network 20, appropriate signals to the AR headset device 16 to overlay the virtual anatomic model 52 (including the virtual maternal anatomy 54 and the virtual fetal anatomy 56) on the physical anatomic model 44. More particularly, because the virtual maternal anatomy 54 is co-registered (using the computing device 14) with the maternal manikin 46, and the virtual fetal anatomy 56 is co-registered (using the computing device 14) with the fetal manikin 66, any change in the position and orientation of the fetal manikin 66 relative to the maternal manikin 46 is reflected in the AR headset device 16's overlaying of the virtual anatomic model 52 on the physical anatomic model 44 via the AR headset device 16. As a result, the virtual maternal anatomy 54 and the virtual fetal anatomy 56 are accurately overlaid on the user 22's view of the maternal manikin 46 via the AR headset device 16.

Turning back to FIG. 1, with continuing reference to FIGS. 2 and 3, in some embodiments, the user 22 physically interacts with the physical anatomic model 12 or the physical anatomic model 44 using the instrument 28. In some embodiments, in addition to tracking the position and orientation of the AR headset device 16, the tracking system 18 is capable of tracking the position and orientation of the instrument 28 in three-dimensional space. In some embodiments, the tracking system 18 tracks the position and orientation of the instrument 28 with six degrees-of-freedom ("6-DoF"), including x, y, and z coordinates of the instrument 28, and pitch, yaw, and roll of the instrument 28. In some embodiments, at least a portion of the tracking system 18 includes, or is part of, the instrument 28. The computing device 14 is capable of receiving, via the network 20, signals from the tracking system 18 relating to the position and orientation of the instrument 28. As a result, the tracking system 18 may be used to determine whether the instrument 28 is impinging on the virtual anatomic model 36 or the virtual anatomic model 52. More particularly, based on the position and orientation of the instrument 28, deformable portions of the virtual anatomic model 36 or the virtual anatomic model 52 are made to appropriately reflect, via the AR headset device 16, the distortion caused by the impinging instrument 28. For example, a blood vessel may become less circular and flatter when pressure is applied to it via the instrument 28. In some instances, the tracking system tracks the position and orientation of the instrument 28 using one or more trackable markers (e.g., physical, infrared, RFID, electromagnetic, etc.) placed on (or in) the instrument and computer vision (e.g., using a suitable camera or other tracking mechanism for the type or marker(s)) of the instrument 28.

Referring to FIGS. 2 and 3, to further augment or otherwise enhance the training experience, ancillary virtual graphics 72 are presented in the user 22's field of view via the AR headset device 16. The ancillary virtual graphics 72 include, but are not limited to, medical data 74, instructional steps 76, expert demonstrations 78, didactic content 80, and exigent circumstances 82. The medical data 74, the instructional steps 76, the expert demonstrations 78, the didactic content 80, and the exigent circumstances 82 provide optic feedback (as indicated by the arrows 24*g-k*, respectively, in FIGS. 2 and 3), and not haptic feedback, to the user 22. The medical data 74 may include, but is not limited to, temperature, blood pressure, pulse, respiration rate, other critical medical data, or any combination thereof. The instructional steps 76 may include, but are not limited to, steps for completing the particular procedure being trained. Thus, in the embodiment of FIGS. 1 and 2, the instructional steps 76 may include steps for completing, for example, routine gestational palpation of the natural fetus, Leopold's Maneuvers to determine the position of the natural fetus inside the natural mother's uterus, an external cephalic version to turn the natural fetus from a breech position or side-lying (transverse) position into a head-down (vertex) position before labor begins, one or more intrauterine fetal procedure(s), true-to-life shoulder dystocia, breech, and C-section deliveries, other diagnostic, treatment, or surgical scenarios, or any combination thereof. In addition, or instead, in the embodiment of FIGS. 1 and 3, the instructional steps may include steps 76 for completing, for example, a proper tracheostomy procedure (including insertion of a trachea tube), a proper pneumothorax procedure, wound hemorrhaging (including proper application of packing pressure as well as, alternatively, proper implementation of an adequate tourniquet at a site suitable to stop the wound(s) from further blood loss), proper treatment of lesions or lacerations caused by battle, combat, explosion, or trauma, other diagnostic, treatment, or surgical scenarios, or any combination thereof. The expert demonstrations 78 supplement the instructional steps 76 and may be overlaid on the physical anatomic model 44 via the AR headset device 16 to demonstrate the correct way to complete one or more of the instructional steps 76. The didactic content 80 provides educational materials such as, for example, medical research, scientific data, etc., to further enrich the training experience. Finally, the exigent circumstances 82 are overlaid on, or peripheral to, the user 22's view of the physical anatomic model 44 via the AR headset device 16. The exigent circumstances 82 may include, but are not limited to, physical trauma (e.g., hemorrhaging), delivery room conditions, operating room conditions, fire, battlefield conditions, one or more other exigencies related to the procedure being trained for, or any combination thereof. In addition to self-guided teaching data, such as cardiopulmonary resuscitation feedback from the physical manikin (e.g., compression rate and depth), the AR headset device 16 can show medical data 74 (e.g., vital signs and/or other measured medical data) in real time.

While example functionalities of the physical anatomic models 12 and 44 are described above, no limitation is intended thereby. Rather, it is understood that the concepts of the present disclosure are applicable to a wide range of medical simulation functionalities and features. Accordingly, in some instances, the physical anatomic models 12 and 44 each include one or more features as described in the context of the simulators disclosed in: U.S. provisional patent application Ser. No. 62/451,557, filed Jan. 27, 2017; U.S. patent application Ser. No. 14/213,932, now U.S. Pat. No. 9,437,117, issued Sep. 6, 2016; U.S. patent application Ser. No. 14/213,962, now U.S. Pat. No. 9,501,953, issued Nov. 22, 2016; U.S. patent application Ser. No. 15/355,982, published as U.S. Pat. App. Pub. No. 2017/0069233 A1 on Mar. 9, 2017; U.S. patent application Ser. No. 13/223,020, now U.S. Pat. No. 8,419,438, issued Apr. 16, 2013; U.S. patent application Ser. No. 13/031,116, now U.S. Pat. No. 8,517,740, issued Aug. 27, 2013; U.S. patent application Ser. No. 13/031,087, now U.S. Pat. No. 8,678,831, issued Mar. 25, 2014; U.S. patent application Ser. No. 13/031,102, now U.S. Pat. No. 8,608,483, issued Dec. 17, 2013; U.S. patent application Ser. No. 12/856,903, now U.S. Pat. No. 8,152,532, issued Apr. 10, 2012; U.S. patent application Ser. No. 12/708,682, now U.S. Pat. No. 8,740,624, issued Jun. 3, 2014; U.S. patent application Ser. No. 12/708,659, now U.S. Pat. No. 8,500,452, issued Aug. 6, 2013; U.S. patent application Ser. No. 11/952,606, now U.S. Pat. No. 8,696,362, issued Apr. 15, 2014; U.S. patent application Ser. No. 11/952,669, published as U.S. Pat. App. Pub. No. 2009/0148822 A1 on Jun. 11, 2009; U.S. Pat. Nos. 8,016,598; 7,976,313; 7,976,312; 7,866,983; 7,114,954; 7,192,284; 7,811,090; 6,758,676; 6,503,087; 6,527,558; 6,443,735; 6,193,519; 5,853,292; and 5,472,345, each of which is hereby incorporated by reference in its entirety.

Further, in some instances, the physical anatomic models 12 and 44 each include one or more features as provided in medical simulators provided by Gaumard Scientific Company, Inc. based out of Miami, Fla., including but not limited to the following models: S1000 Hal®, S1020 Hal®, S1030 Hal®, S3000 Hal®, S2000 Susie®, S221 Clinical Chloe®, S222 Clinical Chloe®, S222.100 Super Chloe®, S303 Code Blue®, S304 Code Blue®, S100 Susie®, S100 Simon®, S200 Susie®, S200 Simon®, S201 Susie®, S201 Simon®, S203 Susie®, S204 Simon®, S205 Simple Simon®, S206 Simple Susie®, S3004 Pediatric Hal®, S3005 Pediatric Hal®, S3009 Premie Hal®, S3010 Newborn Hal®, S110 Mike®, S110 Michelle®, S150 Mike®, S150 Michelle®, S107 Multipurpose Patient Care and CPR Infant Simulator, S117 Multipurpose Patient Care and CPR Pediatric Simulator, S157 Multipurpose Patient Care and CPR Pediatric Simulator, S575 Noelle®, S565 Noelle®, S560 Noelle®, S555 Noelle®, S550 Noelle®, S550.100 Noelle®, S2200 Victoria®, S2220 Super Tory®, and/or other patient simulators.

In some embodiments, the virtual anatomic model 36 or 52 overlays features on the physical anatomic model 12 or 44 that are not ordinarily visible to the user (e.g., life-like animations of internal organs, internal lesions, etc.). In some embodiments, the virtual anatomic model 36 or 52 is synchronized with a physical response from the physical anatomic model 12 or 44 (e.g., changes to the fetal heart rate via the computing device 14 causing movement of the virtual fetal anatomy 56, suprapubic pressure maneuvers applied to the physical anatomic model 12 or 44 will cause deflections to the virtual fetal anatomy 56, etc.). In some embodiments, the AR system 10 further comprises a speaker (not shown) operable to add spatial sound to increase the realism of the simulated procedure (e.g., heart rate beep, speech from virtual anatomic model 36 or 52, etc.) or to add audible cues to the ancillary virtual graphics 72. In some embodiments, the virtual anatomic model 36 or 52 augments the external appearance of the physical anatomic model 12 or 44 using virtual elements (e.g., skin lesions, scars, wrinkles, etc.). In some embodiments, the virtual anatomic model 36 or 52 adds features that are absent from the physical anatomic model 12 or 44 (e.g., limbs, head, arms, torso). As a result, some or all of the physical anatomic model 12 or 44 is represented holographically by the virtual anatomic model 36 or 52. In some embodiments, the ancillary virtual graphics 72 are added to the optic feedback 24 (i.e., via the optic feedback 24*g-k*) without occluding the user 22's field of view. In some embodiments, the AR headset device 16 includes one or more camera's to capture and record the user 22's gaze and position so that such information can be shared with the computing device 14 via the network 20 to debrief the user 22 after completion of a training exercise. In some embodiments, the AR system 10 is capable of displaying, via the virtual anatomic model 36 or 52 on the AR headset device 16, an internal organ slice along 3 orthogonal planes.

Figure 4:
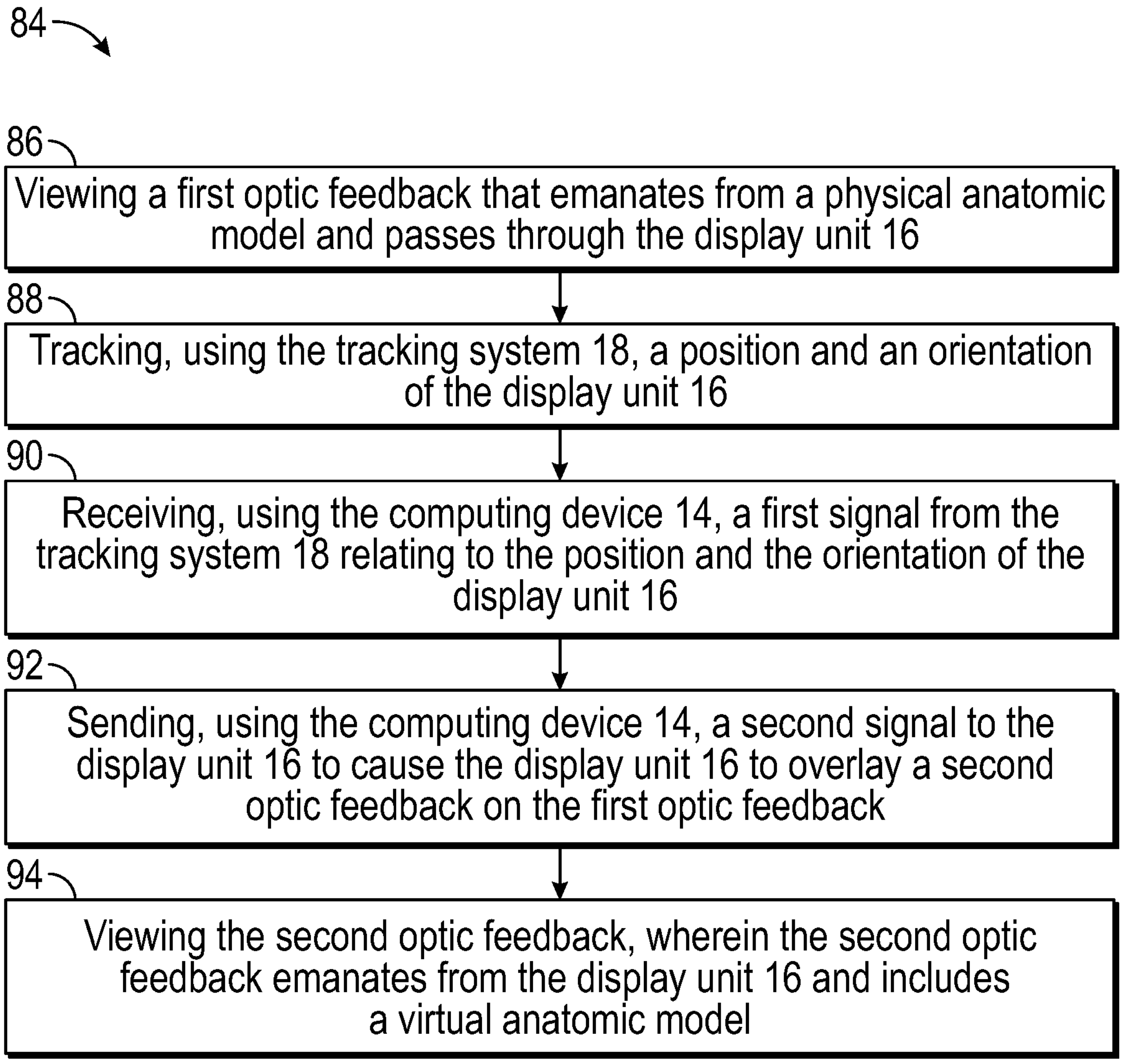
FIG. 4 is a flow diagram of a method of operating the system of FIG. 1 according to one or more embodiments of the present disclosure.

Referring to FIG. 4, with continuing reference to FIGS. 1-3, a method is generally referred to by the reference numeral 84. The method 84 includes viewing a first optic feedback (e.g., the optic feedback 24*aa* or 24*ca*) that emanates from a physical anatomic model (e.g., the physical anatomic model 12 or 44) and passes through the AR headset device 16 at a step 86; tracking, using the tracking system 18, a position and an orientation of the AR headset device 16 at a step 88; receiving, using the computing device 14, a first signal from the tracking system 18 relating to the position and the orientation of the AR headset device 16 at a step 90; sending, using the computing device 14, a second signal to the AR headset device 16 to cause the AR headset device 16 to overlay a second optic feedback (e.g., the optic feedback 24*ab* and 24*b*, or the optic feedback 24*cb* and 24*d-f*) on the first optic feedback at a step 92, the second signal being based on the first signal; and viewing the second optic feedback at a step 94, wherein the second optic feedback emanates from the AR headset device 16 and includes a virtual anatomic model (e.g., the virtual anatomic model 36 or 52). In some embodiments, the second optic feedback further includes the ancillary virtual graphics 72 (e.g., the optic feedback 24*g-k*), the ancillary virtual graphics 72 including one or more of: the medical data 74, the instructional steps 76, the expert demonstrations 78, the didactic content 80, and the exigent circumstances 82.

In some embodiments of the method 84, the method 84 is accomplished using the physical anatomic model 12 and the virtual anatomic model 36. In such embodiments, the method 84 further includes co-registering, using the computing device 14, the virtual anatomy 38 with the manikin 30 to ensure an accurate spatial relationship therebetween, and the second signal is further based on the co-registering of the virtual anatomy 38 with the manikin 30.

In other embodiments of the method 84, the method 84 is accomplished using the physical anatomic model 44 and the virtual anatomic model 52. In such embodiments, the method 84 further includes co-registering, using the computing device 14, the virtual fetal anatomy 56 and/or the virtual maternal anatomy 54 with the maternal manikin 46 to ensure an accurate spatial relationship therebetween, and the second signal is further based on the co-registering of the virtual fetal anatomy 56 and/or the virtual maternal anatomy 54 with the maternal manikin 46. In addition, or instead, the method 84 further includes tracking, using the tracking system 18, a position and an orientation of the fetal manikin 66 relative to the maternal manikin 46; co-registering, using the computing device 14, the virtual fetal anatomy 56 with the fetal manikin 66 to ensure an accurate spatial relationship therebetween; and receiving, using the computing device 14, a third signal from the tracking system 18 relating to the position and the orientation of the fetal manikin 66 relative to the maternal manikin 46. In such embodiment(s), the second signal is further based on the third signal and the co-registering of the virtual fetal anatomy 56 with the fetal manikin 66.

Figure 5:
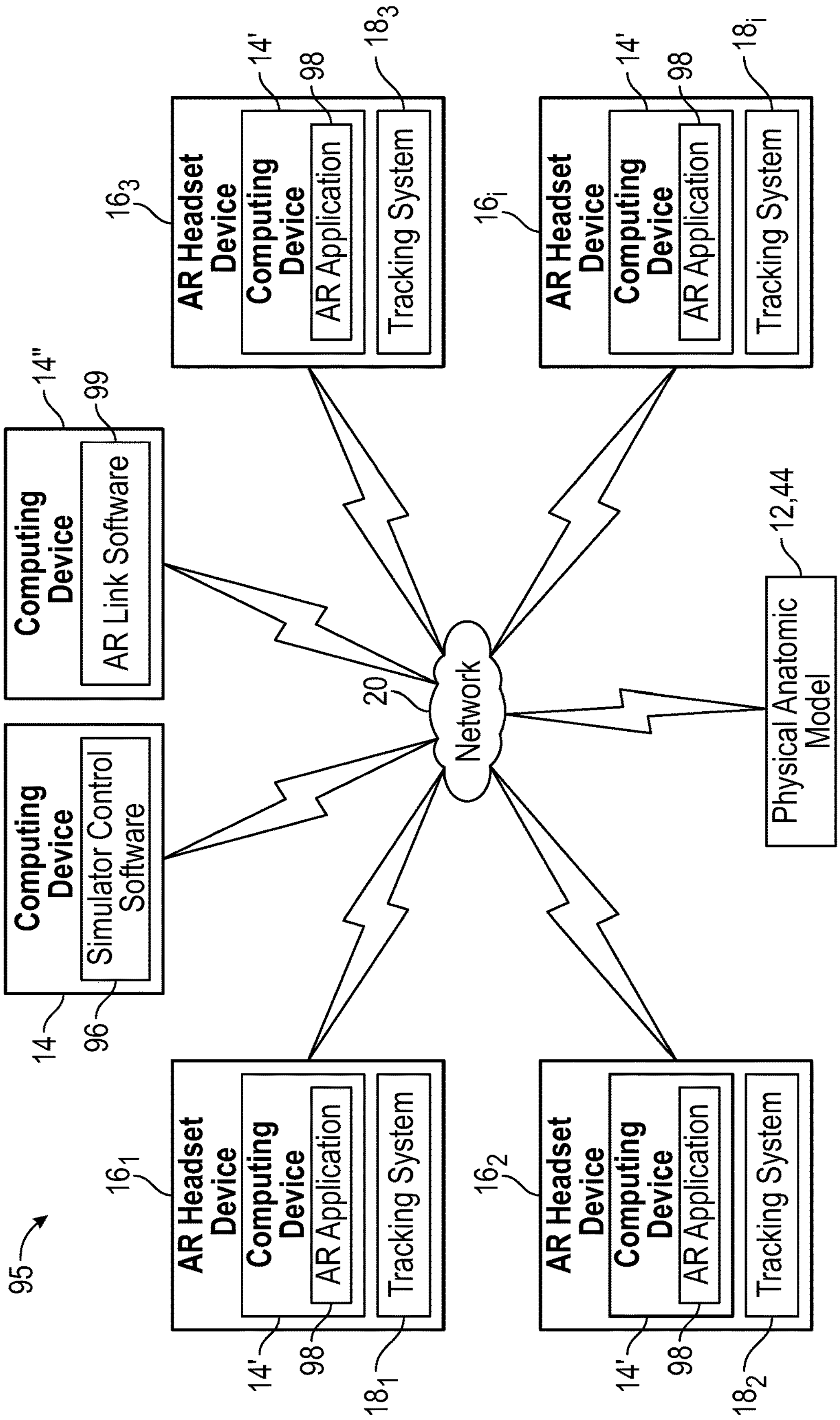
FIG. 5 is a diagrammatic illustration of an augmented reality system including at least the augmented reality system of FIG. 1 according to one or more embodiments of the present disclosure.

In an embodiment, as illustrated in FIG. 5, an AR system is generally referred to by the reference numeral 95 and includes at least the components of the system 10. More particularly, the AR system 95 includes the computing device 14, the physical anatomic model 12 and/or 44, and a plurality of AR headset devices $\mathbf{16}_1$, $\mathbf{16}_2$, $\mathbf{16}_3$, and $\mathbf{16}_i$. The computing device 14 is connected to the network 20 and includes unified simulator control software 96 such as, for example Gaumard's UNI® software, to monitor and control the physiology of the physical anatomic model 12 and/or 44, to monitor and control the AR headset devices $\mathbf{16}_{1\text{-}i}$ (and thus users' actions), and to support data-rich debriefing before, during, or after completion of a particular training scenario. The AR headset devices $\mathbf{16}_{1\text{-}i}$ are connected to the network 20 and include onboard tracking systems $\mathbf{18}_1$, $\mathbf{18}_2$, $\mathbf{18}_3$, and $\mathbf{18}_i$, respectively, adapted to track the positions and orientations of the AR headset devices $\mathbf{16}_{1\text{-}i}$ in three-dimensional space and relative to the physical anatomic model 12 and/or 44. Additionally, the AR headset devices $\mathbf{16}_{1\text{-}i}$ each include an onboard computing device 14' separate from, but substantially similar to, the computing device 14. The computing device 14' of each AR headset device $\mathbf{16}_{1\text{-}i}$ runs an AR application 98 to facilitate a user's control of the various features and scenarios available to the AR headset devices $\mathbf{16}_{1\text{-}i}$. In several embodiments, the AR system 95 also includes a computing device 14" connected to the network 20 and adapted to run AR link software 99, as will be described in further detail below.

In some embodiments, the unified simulator control software 96 may come preconfigured on a tablet PC and include a library of modifiable, prebuilt scenarios to save time and development resources. In some embodiments, the unified simulator control software 96 allows an instructor to control a variety of vital signs of the manikin to demonstrate a variety of patient presentations realistically. In some embodiments, the unified simulator control software 96 allows an instructor to create scenarios tailored to specific learning objectives and offer participants a wide range of standardized, repeatable learning events.

In some embodiments, the computing device 14 may be, include, or be part of a variety of computing devices; thus, as used herein the reference numeral 14 (without the suffixes (') or (")) may refer to one, or a combination, of the computing devices 14' and 14" described herein. In some embodiments, the AR headset device 16 may be, include, or be part of a variety of AR headset devices; thus, as used herein the reference numeral 16 (without the suffixes 1, 2, 3, or i) may refer to one, or a combination, of the AR headset devices $\mathbf{16}_{i\text{-}i}$ described herein. In some embodiments, the tracking system 18 may be, include, or be part of a variety of tracking systems; thus, as used herein the reference numeral 18 (without the suffixes 1, 2, 3, or i) may refer to one, or a combination, of the tracking systems $\mathbf{18}_1$, $\mathbf{18}_2$, $\mathbf{18}_3$, and $\mathbf{18}_i$ described herein.

Figure 6A:
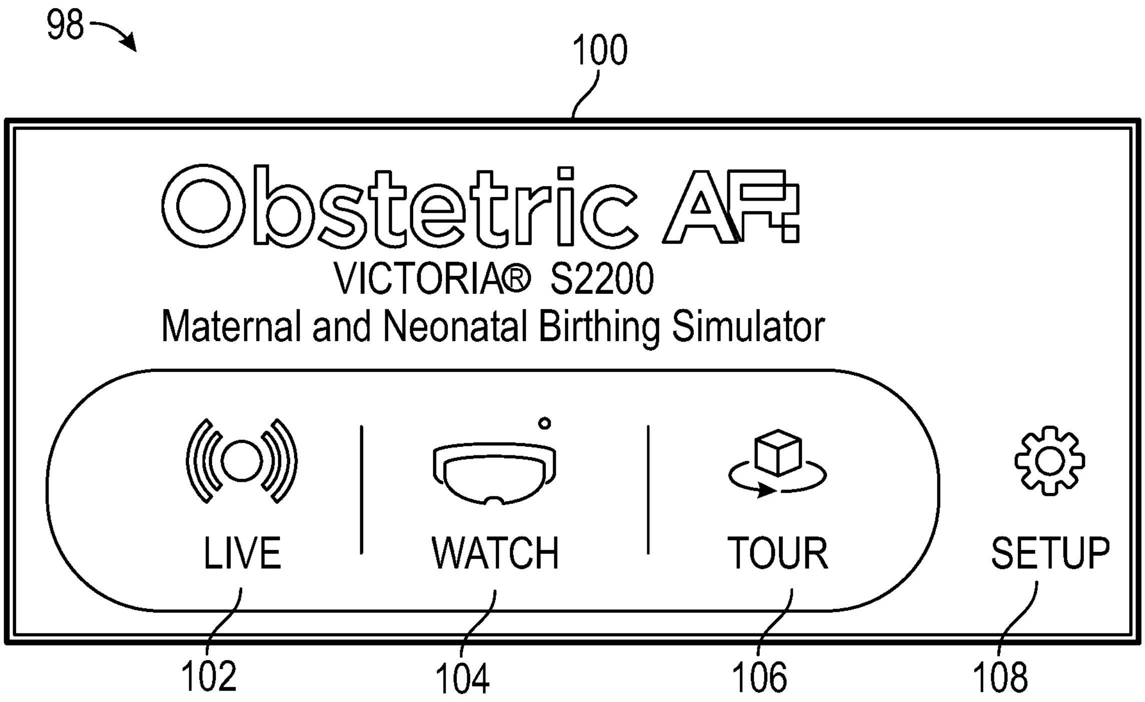
FIG. 6A is a graphical illustration of an augmented reality module adapted to be presented on the augmented reality system of FIGS. 1 and/or 5 according to one or more embodiments of the present disclosure.

In an embodiment, as illustrated in FIG. 6A, the AR application 98 on each AR headset device $\mathbf{16}_{1\text{-}i}$ includes a hub menu (not shown) presented to the user prior to the initiation of a particular scenario. The hub menu may be presented to the user on the screen of the AR headset device $\mathbf{16}_{1,\ 2,\ 3,\ or\ i}$ or on another display unit (e.g., a computer monitor, a television, etc.). The hub menu may include selectable icons for various AR simulations, depending on the particular type of training session desired, including, among others, an obstetric AR module 100 (shown in FIG. 6A), a trauma AR module (not shown), and a pediatric AR module (not shown). A graphical illustration of the obstetric AR module 100 is shown in FIG. 6A and includes selectable icons for a live mode 102, a watch mode 104, a tour mode 106, and a setup mode 108. The obstetric AR module 100, for example, is designed to improve the student learning process by using overlays of obstetric anatomy (e.g., the virtual maternal anatomy 54 and/or the virtual fetal anatomy 56), and animations to better visualize the mechanics of childbirth and various birthing complications, as will be described in further detail below. Such 3D animations have been proven to be better teaching aids than words and pictures in a book.

Figure 6B:
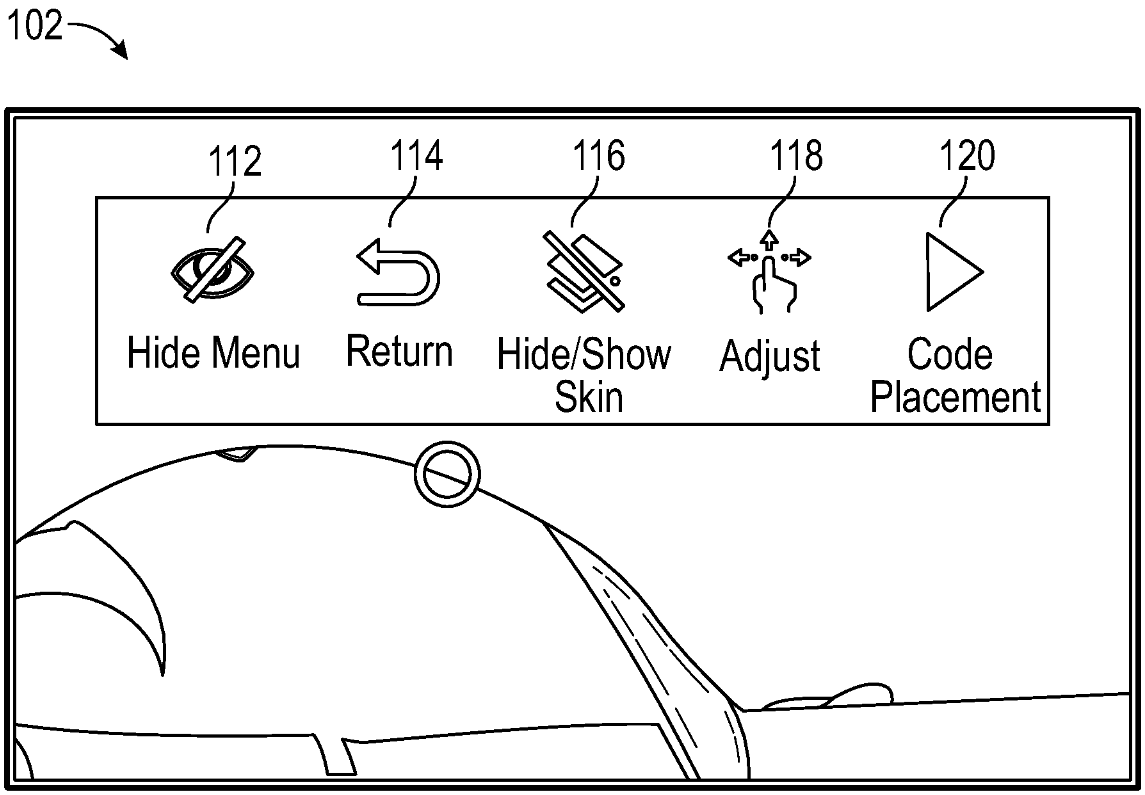
FIG. 6B is a graphical illustration of a live mode of the augmented reality module of FIG. 6A according to one or more embodiments of the present disclosure.
Figure 6C:
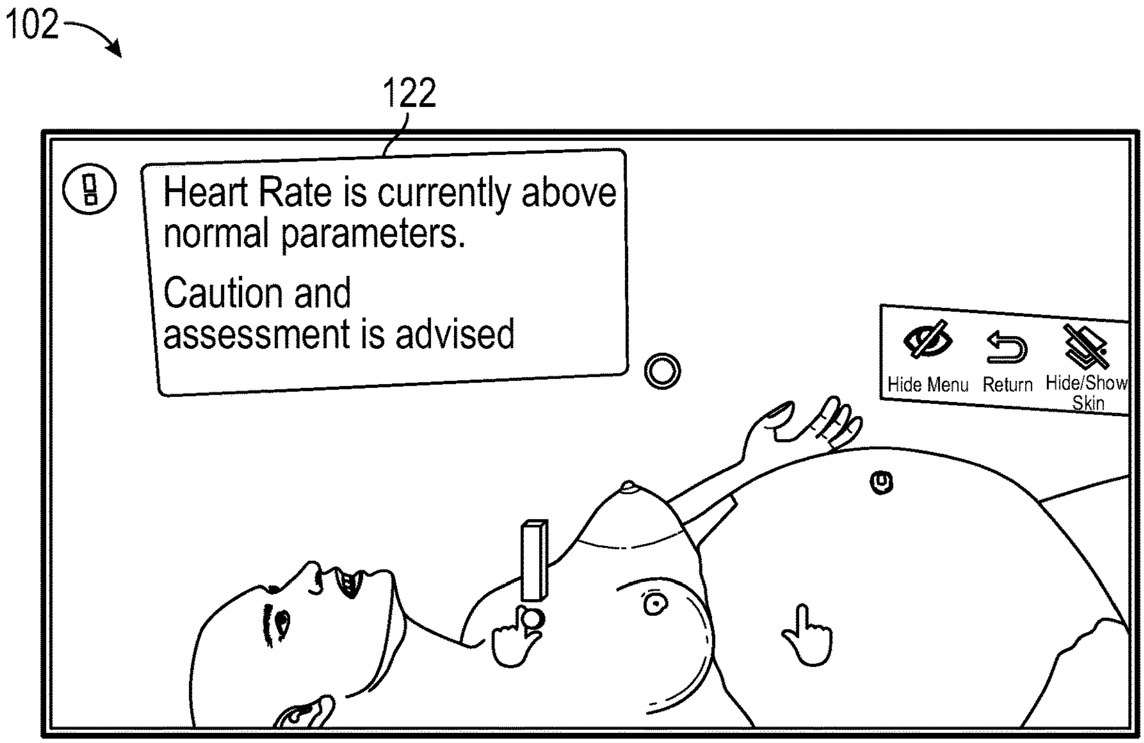
FIG. 6C is another graphical illustration of the live mode of the augmented reality module of FIG. 6A according to one or more embodiments of the present disclosure.

In an embodiment, as illustrated in FIGS. 6B, the live mode 102 projects a holographic overlay of a 3D fetus and obstetric anatomy (e.g., the virtual maternal anatomy 54 and/or the virtual fetal anatomy 56) on top of a physical simulator or manikin (e.g., the physical anatomic model 44). The live mode 102 further includes a heads-up menu 110 having a variety of buttons selectable by the user such as, for example, a "hide menu" button 112, a "return" button 114, a "hide/show skin" button 116, a "adjust view" button 118, and a "code placement" button 120. In the embodiment shown in FIG. 6B, the "hide/show skin" button 116 is toggled to the hide position such that the fetus and obstetric anatomy (e.g., the virtual fetal anatomy 56 and the internal virtual structures 58 if the virtual maternal anatomy 54) are not visible. The "code placement" button 120 is operable to register the holographic animations to the physical manikin (e.g., the physical anatomic model 44) in a manner that will be described in further detail below. The 3D animations may be updated periodically in accordance with the current state of the simulated labor scenario. Specifically, data may be communicated in real time between the AR headset devices $\mathbf{16}_{1\text{-}i}$ and the unified simulator control software 96 to update fetal rotations, fetal positions, and vital signs of both the mother and child to augment what is seen by the user in order to improve the educational experience, as will be described in further detail below. Because this transfer of data gives the users the current status of their simulated patient, warnings and directives may also be delivered to the users (and/or other participants) in the form of visual or audible cues. For example, as shown in FIG. 6C, the live mode 102 may include an emergency panel 122 capable of delivering a warning in the event that a simulated patient's heart rate should rise above a normal range (e.g., "heart rate is currently above normal parameters" "caution and assessment is advised").

Figure 6D:
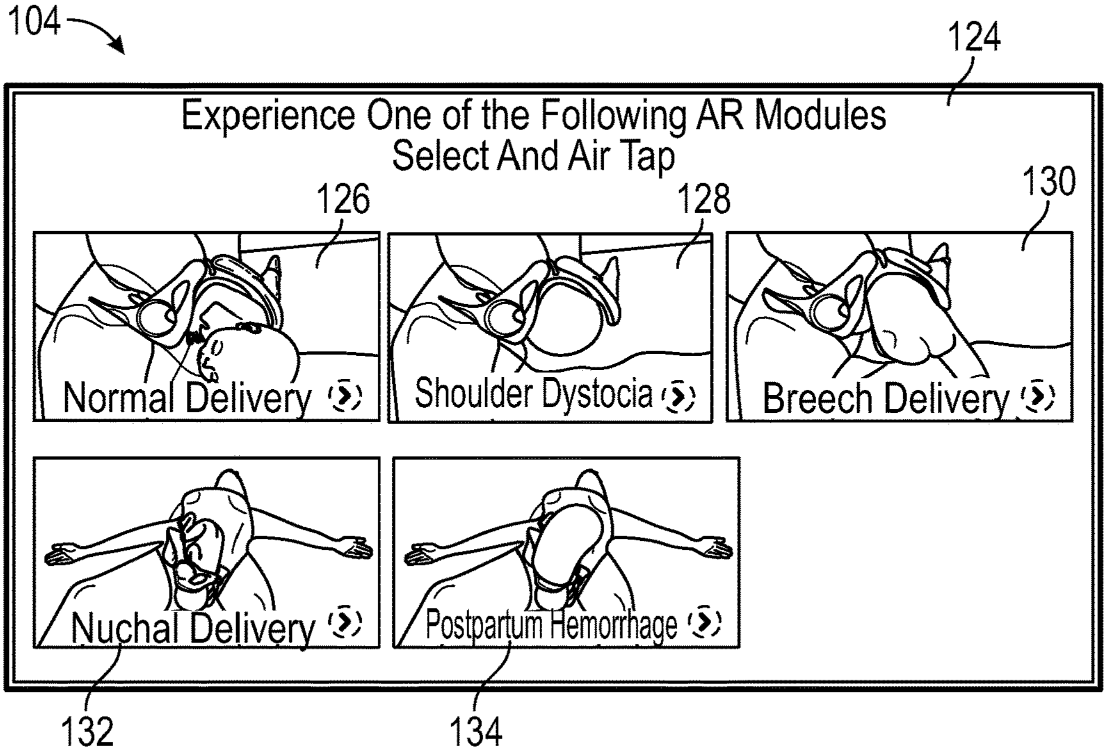
FIG. 6D is a graphical illustration of a watch mode of the augmented reality module of FIG. 6A according to one or more embodiments of the present disclosure.
Figure 6E:
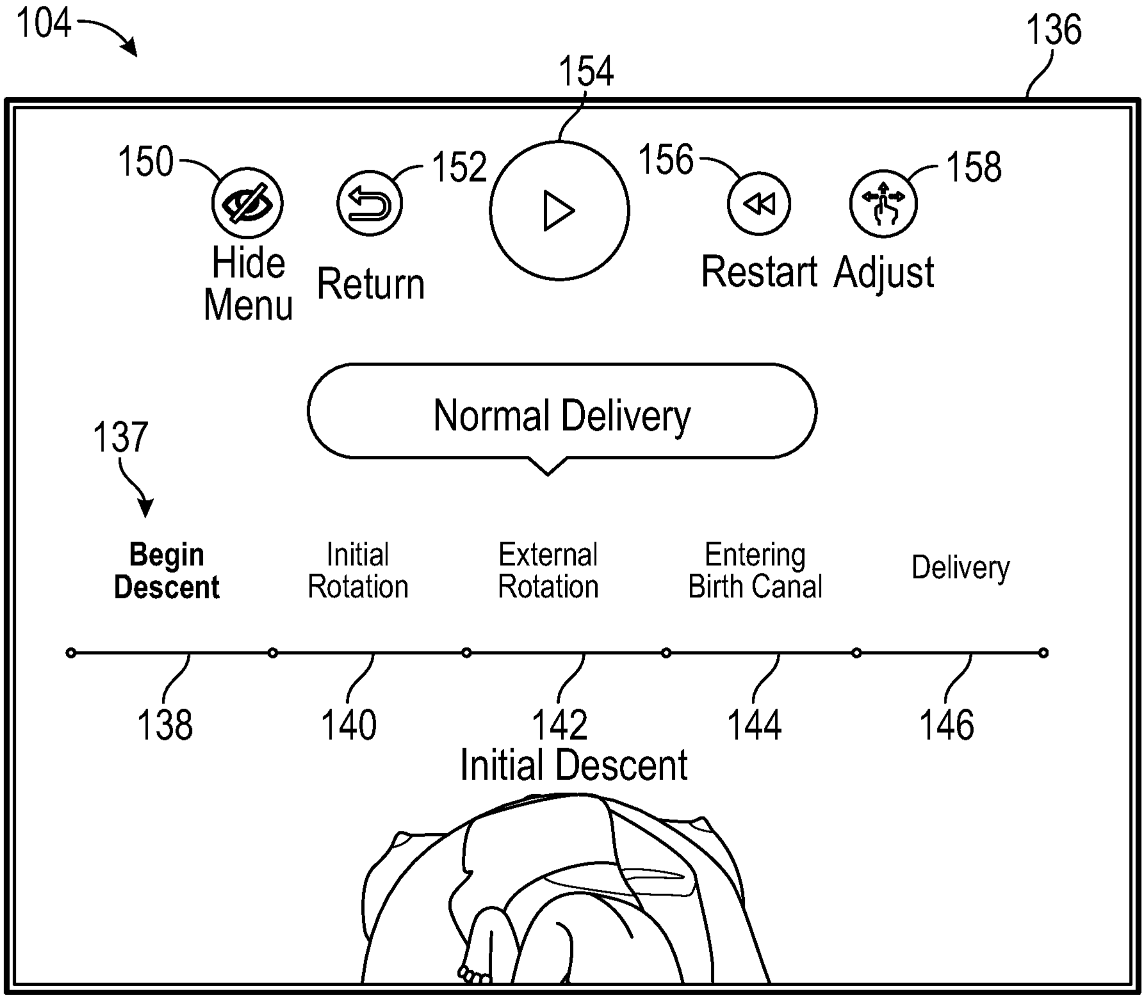
FIG. 6E is another graphical illustration of the watch mode of the augmented reality module of FIG. 6A according to one or more embodiments of the present disclosure.

In an embodiment, as illustrated in FIG. 6D, the watch mode 104 allows the user to play through animations of various childbirth scenarios and birthing complications along with teaching tips and maneuvers to facilitate childbirth in the event of a complication. An example selection menu 124 for the various birthing scenarios is illustrated in FIG. 6C. Examples of such childbirth scenarios include, but are not limited to, normal delivery 126, shoulder dystocia 128, breech delivery 130, nuchal chord delivery 132, and postpartum hemorrhage 134. After a particular birthing scenario is selected from the selection menu 124 (e.g., when the user selects the type of birth he/she would like to view), the user is presented with a hologram of the manikin together with a birthing menu to control the scenario. An example birthing menu 136 for the normal delivery 126 is illustrated in FIG. 6E. In the embodiment shown in FIG. 6E, the birthing menu 136 includes a timeline 137 via which the user may select which stage of the normal delivery 126 to view, including a "begin descent" stage 140, an "initial rotation" stage 142, an "external rotation" stage 144, an "entering birth canal" stage 146, and a "delivery" stage 148. The birthing menu 136 also includes buttons for controlling the simulation such as, for example a "hide menu" button 150, a "return" button 152, a "pause/play" button 154, a "restart" button 156, and an "adjust view" button 158. The visualization of obstetric anatomy using life-size 3D holograms in the watch mode 104 helps to reinforce student learning.

Figure 6F:
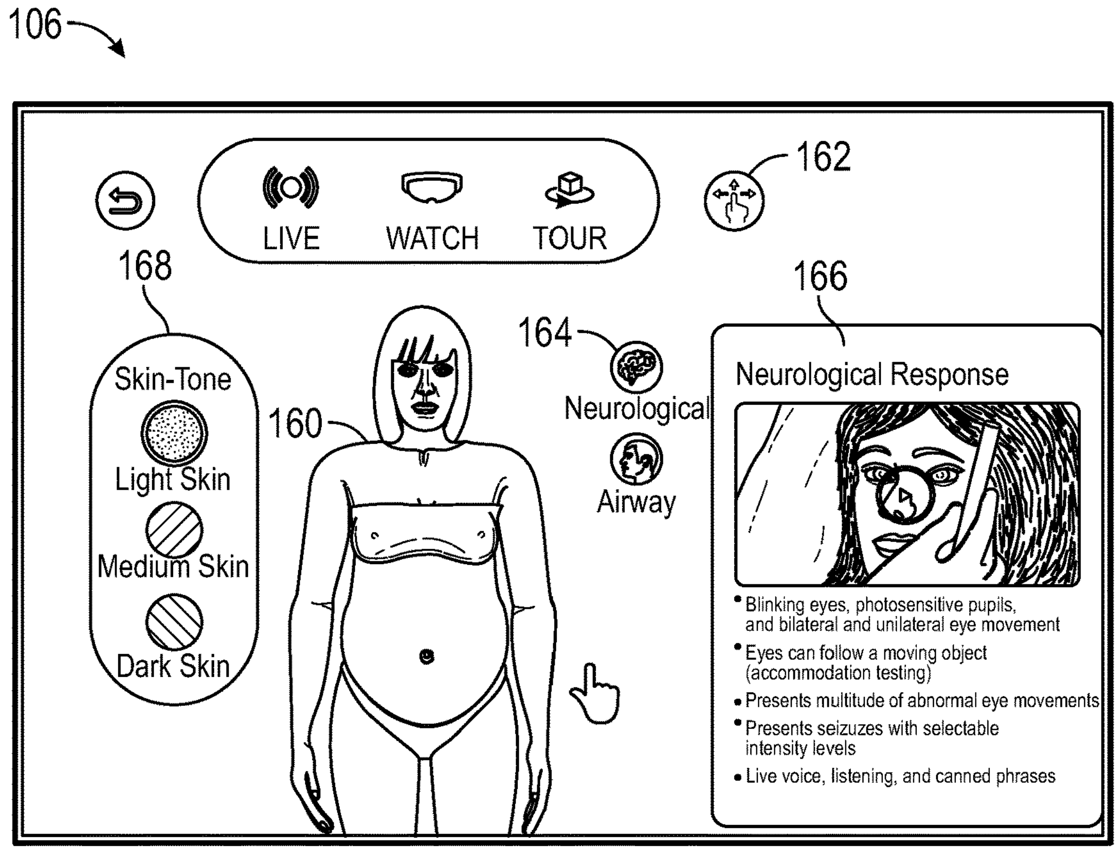
FIG. 6F is a graphical illustration of a tour mode of the augmented reality module of FIG. 6A according to one or more embodiments of the present disclosure.

In an embodiment, as illustrated in FIG. 6F, the tour mode 106 provides a tour of the various simulator features overlaid on a standing hologram 160 of the manikin (e.g., the maternal manikin 46). Using an "adjust view" button 162, the user can gaze at various parts of the hologram 160 to receive an overview of features pertaining to a particular part or parts of the hologram 160. The tour mode 106 may also include various buttons and panels corresponding to the particular part of the hologram 160 at which the user is gazing. For example, FIG. 6F illustrates a scenario in which the user has selected the head of the standing hologram 160 of the manikin together with a "neurological" button 164. In response to the user's selection of the "neurological" button 164, the tour mode 106 displays an information panel 166 pertaining to neurological response features of the manikin (e.g., the maternal manikin 46). The tour mode 106 may further include various other buttons and panels including, but not limited to, a skin tone panel 168 having buttons to select various skin tones to display on the standing hologram 160 of the manikin. The framework of the tour mode 106 is applicable to a wide variety of manikins (including, for example, the manikin 30, the maternal manikin 46, the fetal manikin 66, and/or another manikin) and provides a teaching tool for students and observers to familiarize themselves with the various features of a particular manikin before, during, or after an interaction with the manikin.

Figure 6G:
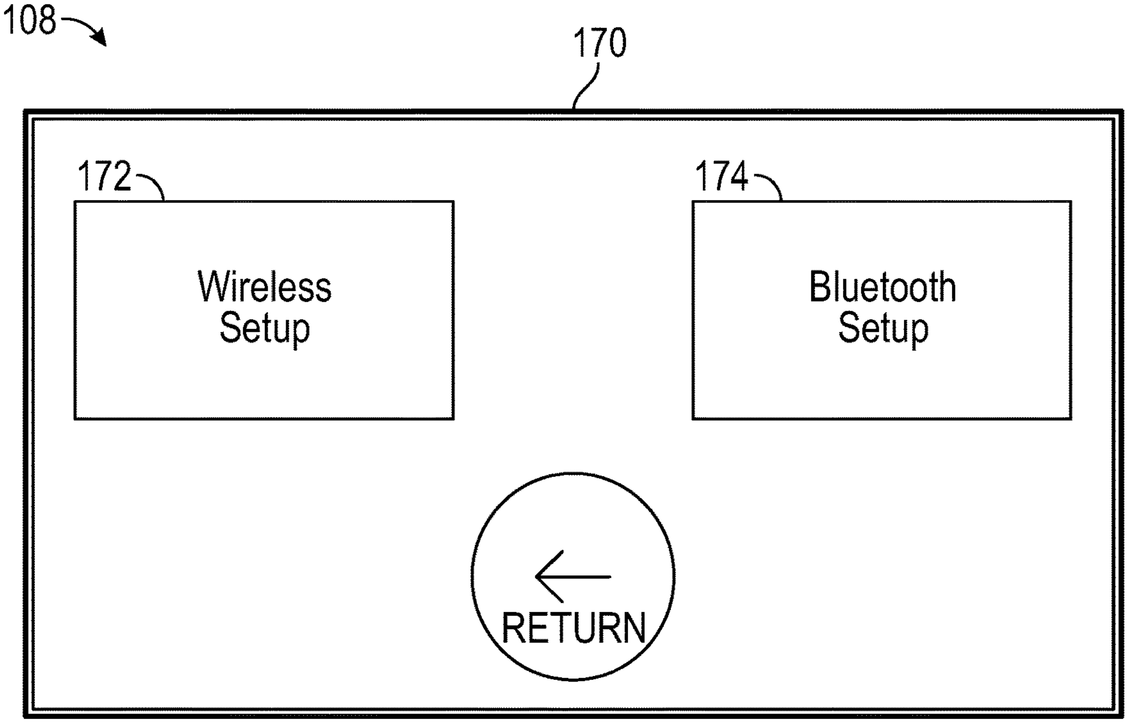
FIG. 6G is a graphical illustration of a setup mode of the augmented reality module of FIG. 6A according to one or more embodiments of the present disclosure.
Figure 6H:
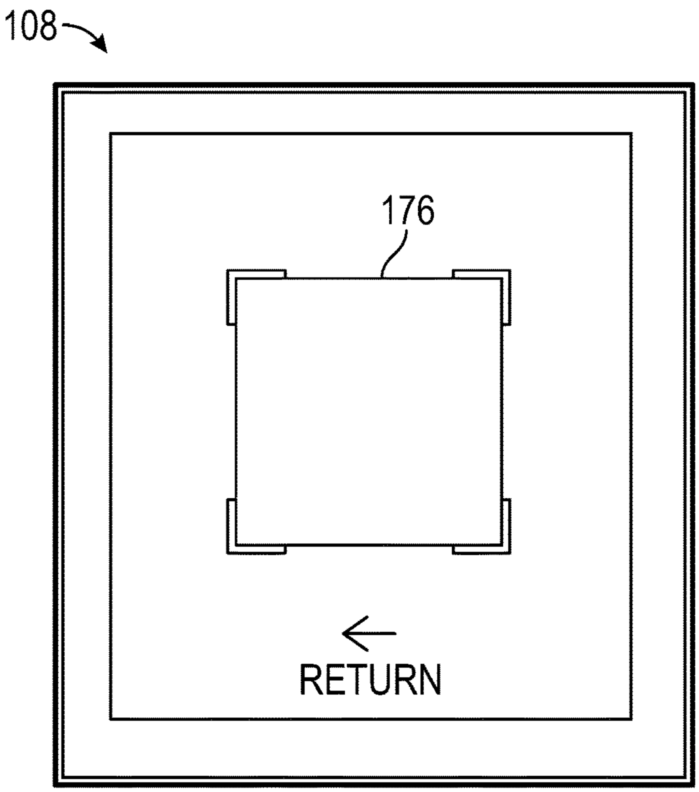
FIG. 6H is a graphical illustration of a scan box adapted to appear upon selection of a "wireless setup" button of the setup mode of FIG. 6G according to one or more embodiments of the present disclosure.
Figure 6I:
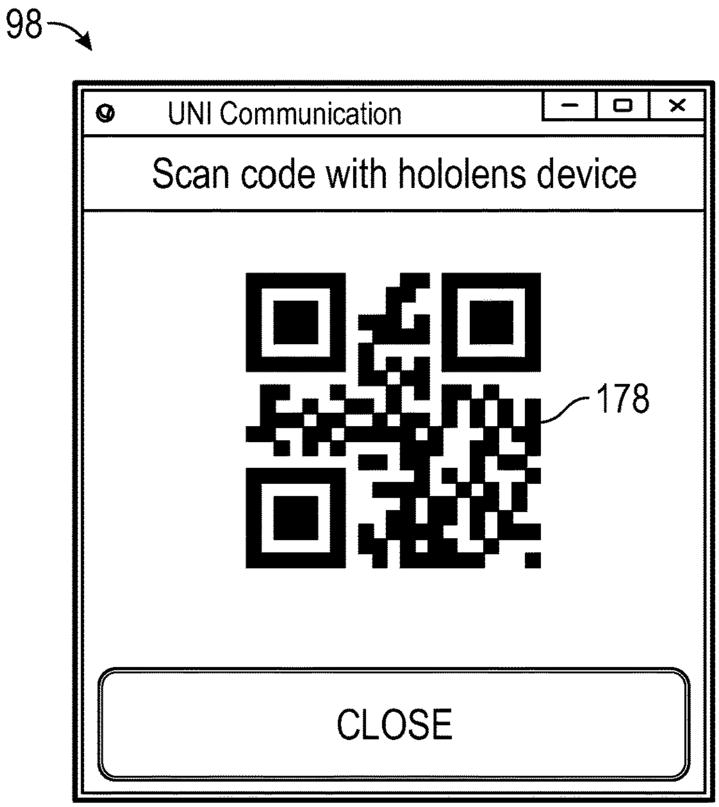
FIG. 6I is a graphical illustration of a QR code adapted to be scanned by the using the scan box of FIG. 6H according to one or more embodiments of the present disclosure.

In an embodiment, as illustrated in FIGS. 6G-6I, the setup mode 108 focuses on connectivity between the unified simulator control software 96 and the AR headset devices $\mathbf{16}_{1\text{-}i}$. An example connectivity menu 170 including a "wireless setup" button 172 and a "Bluetooth setup" button 174 is illustrated in FIG. 6G. The user's selection of the "wireless setup" button 172 from the connectivity menu 170 presents the user with a scan box 176, such as that illustrated in FIG. 6H, except that, rather than being blank, the scan box 176 is filled with the user's field of view (i.e., the field of view seen by the AR headset device $\mathbf{16}_{1, 2, 3, \textit{or } i}$). The scan box 176 can then be lined up by the user with a QR code 178 produced by the unified simulator control software 96 to establish a connection between the unified simulator control software 96 and the AR headset device $\mathbf{16}_{1, 2, 3, \textit{or } i}$, as shown in FIG. 6I. The QR code 178 generated by the unified simulator control software 96 contains all of the network settings required to establish such a connection (via, e.g., the network 20).

Figure 6J:
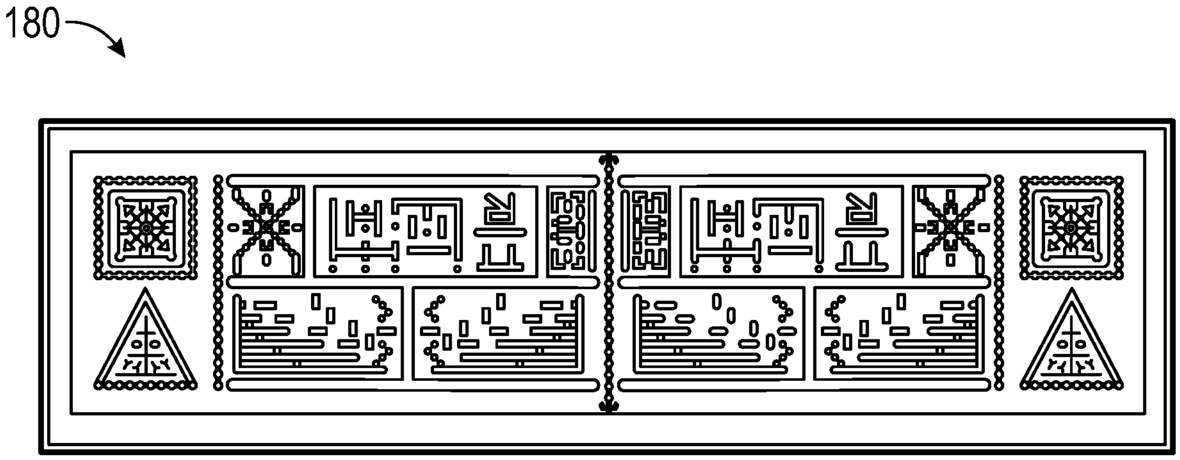
FIG. 6J is a graphical illustration of customized code adapted to register a virtual anatomic model with a physical anatomic model of the augmented reality system of FIGS. 1 and/or 5 according to one or more embodiments of the present disclosure.
Figure 6K:
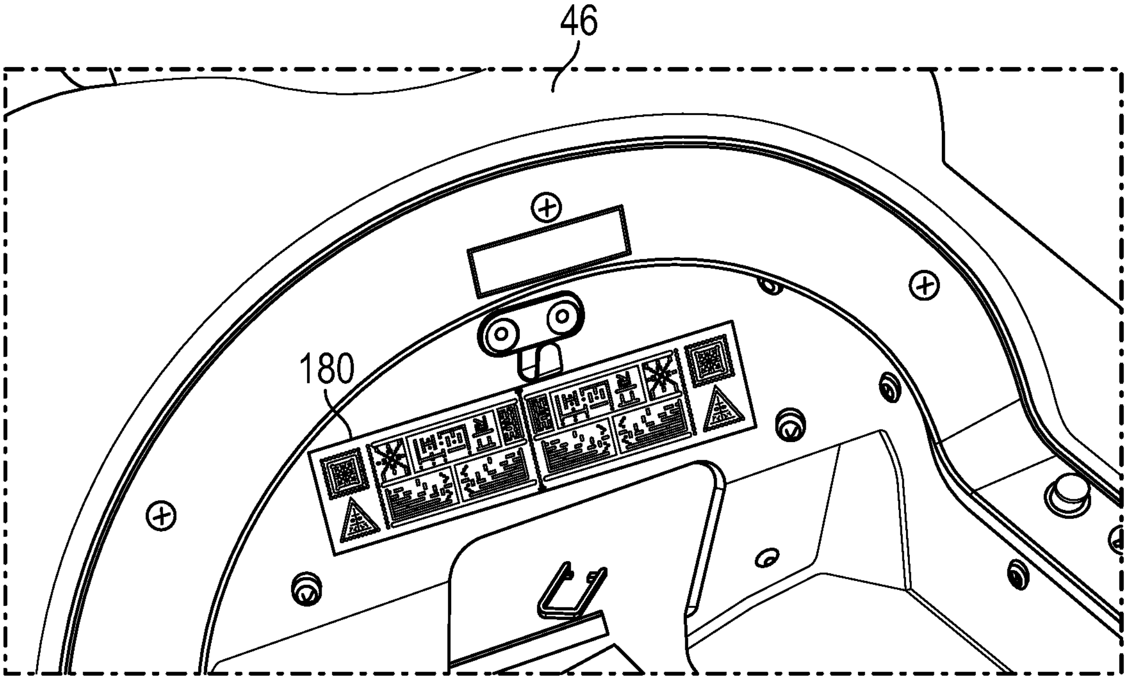
FIG. 6K is a perspective view of the customized code of FIG. 6J attached to the physical anatomic model of the augmented reality system of FIGS. 1 and/or 5 according to one or more embodiments of the present disclosure.
Figure 6L:
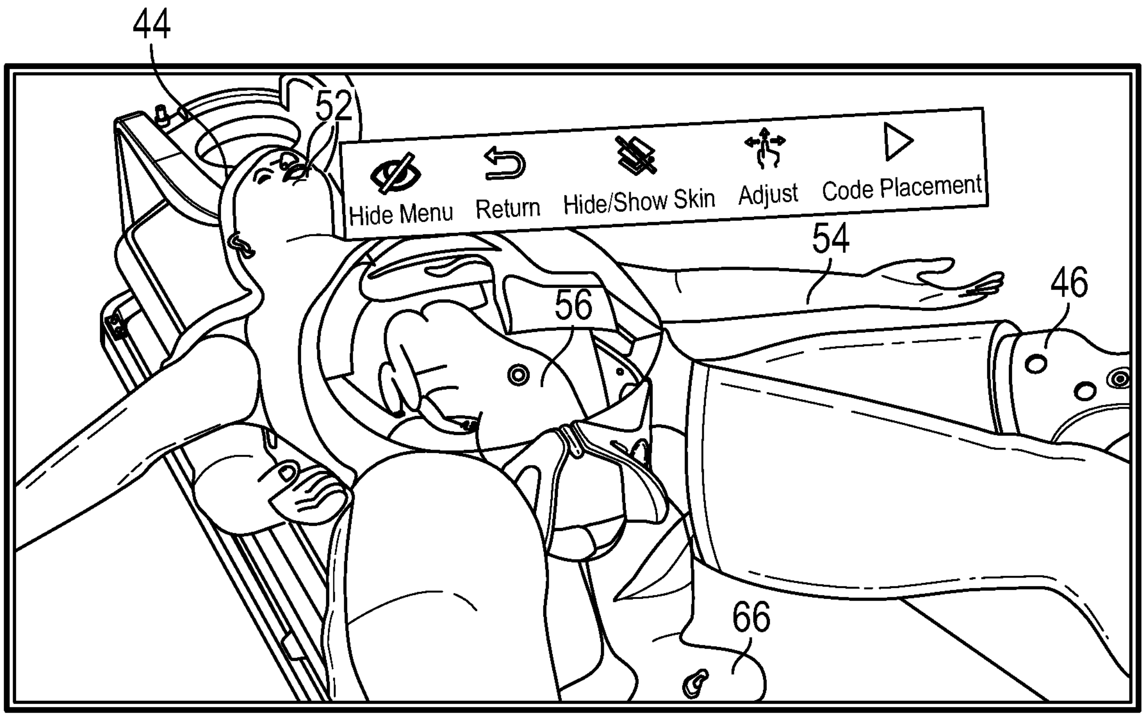
FIG. 6L is a perspective view of a virtual anatomic model registered with a physical anatomic model of the augmented reality system of FIGS. 1 and/or 5 using the customized code of FIGS. 6J and 6K according to one or more embodiments of the present disclosure.

In an embodiment, as illustrated in FIGS. 6J-6L, the obstetric AR module 100 utilizes object recognition software such as, for example, Vuforia™ object recognition software, to read and recognize a customized code 180 in order to place and orient holograms (e.g., the virtual anatomic model 36 and/or 52) in the real world (e.g., relative to the physical anatomic model 12 and/or 44). For example, this feature may be used in the live mode 102 to overlay a hologram over the physical manikin, and in the watch mode 104 to automatically place the hologram on a real-world surface (e.g., an examination surface). An example of the customized code 180 is illustrated in FIG. 6J. Moreover, an example of the placement of the customized code 180 on the manikin (e.g., the maternal manikin 46) is illustrated in FIG. 6K. Specifically, the customized code 180 is placed in a particular location and orientation on the manikin so that, when the customized code 180 is scanned by the AR headset device $\mathbf{16}_{1, 2, 3, \textit{or } i}$, it will accurately register the hologram (e.g., the virtual anatomic model 36 and/or 52) with the manikin (e.g., the physical anatomic model 12 and/or 44), as shown in FIG. 6L. More particularly, FIG. 6L illustrates an embodiment in which the virtual anatomic model 52 (including the virtual maternal anatomy 54 and the virtual fetal anatomy 56) is registered to the physical anatomic model 44 (including the maternal manikin 46 and the fetal manikin 66) using the customized code 180. In some embodiments, registration of the hologram with the manikin using the customized code 180 centers the hologram in relation to the manikin. The use of the customized code 180 to register the hologram with the manikin means that the user is not required to manually align the hologram with the manikin every time the obstetric AR module 100 is used (or the requirement for manual alignment is at least reduced).

Figure 6M:
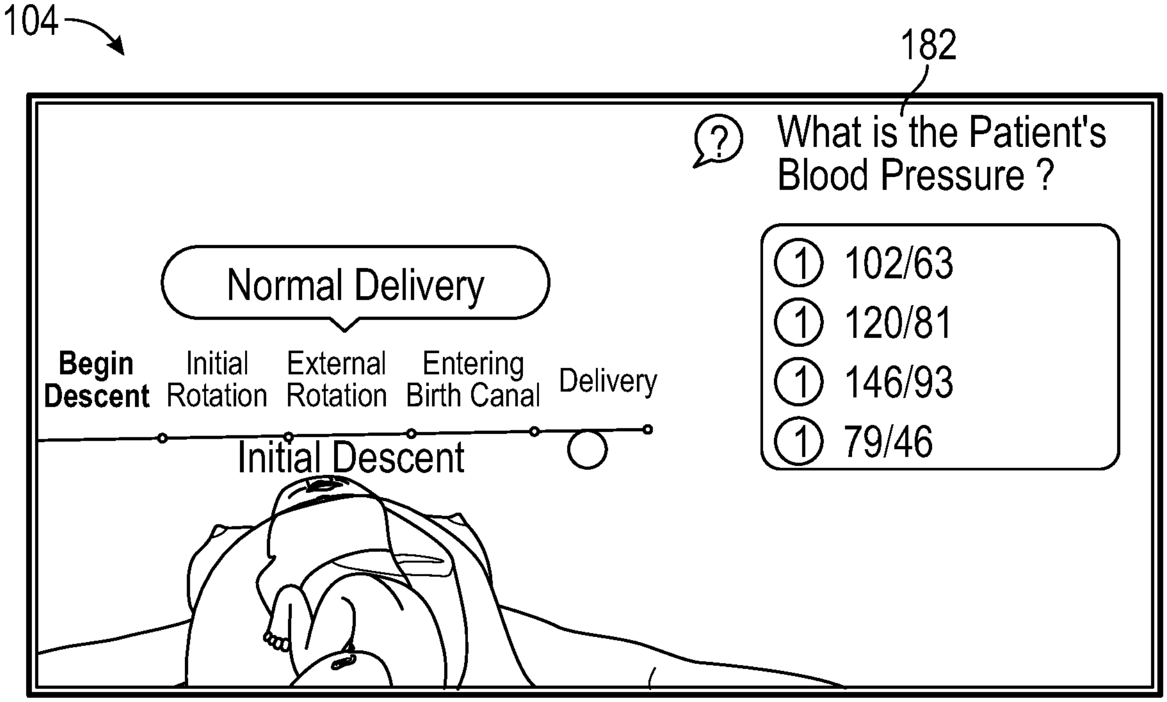
FIG. 6M is a graphical illustration of an example question presented in a watch mode of the augmented reality system of FIGS. 1 and/or 5 according to one or more embodiments of the present disclosure.
Figure 6N:
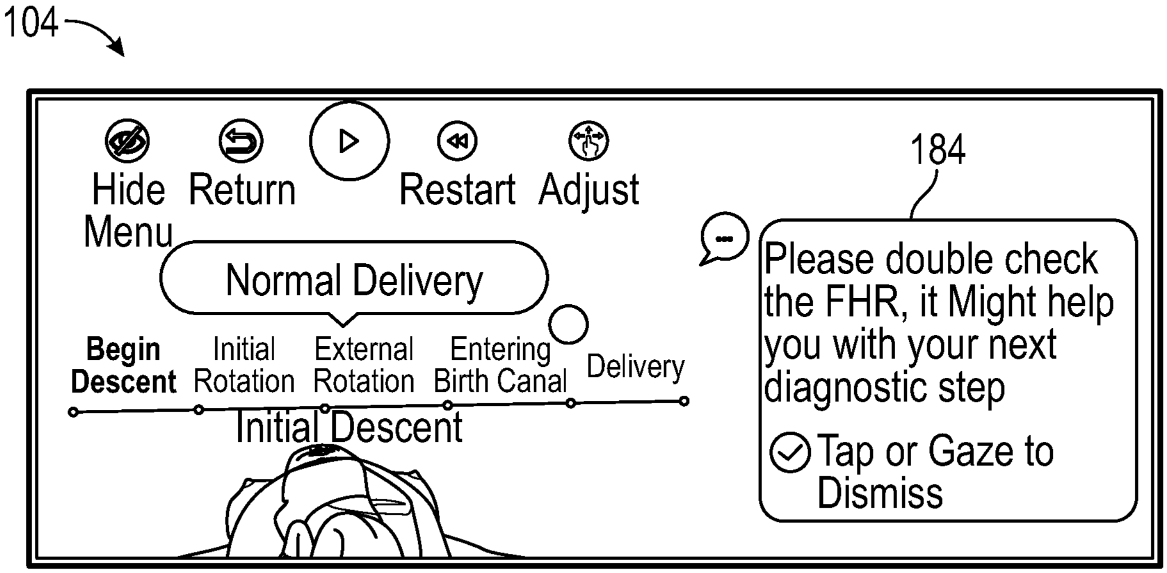
FIG. 6N is a graphical illustration of an example message presented in a watch mode of the augmented reality system of FIGS. 1 and/or 5 according to one or more embodiments of the present disclosure.

In an embodiment, as illustrated in FIGS. 6M and 6N, the unified simulator control software 96 has the ability to send questions and messages to the AR headset devices $\mathbf{16}_{1\text{-}i}$ as a group or to one specific AR headset device $\mathbf{16}_{1, 2, 3, \textit{or } i}$. Specifically, an instructor may send questions to a group of students, or may discretely send questions to an individual student to evaluate his/her understanding of a particular training scenario. For example, FIG. 6M shows an example question 182 being asked via the AR headset devices $\mathbf{16}_{1, 2, 3, \textit{and/or } i}$ (i.e., "what is the patient's blood pressure") during the normal delivery 126 in watch mode 104. For another example, FIG. 6N shows an example message 184 being delivered to the AR headset devices $\mathbf{16}_{1, 2, 3, \textit{and/or } i}$ (i.e., "please double check the FHR, it might help you with your next diagnostic step") during the normal delivery 126 in watch mode 104.

Figure 7A:
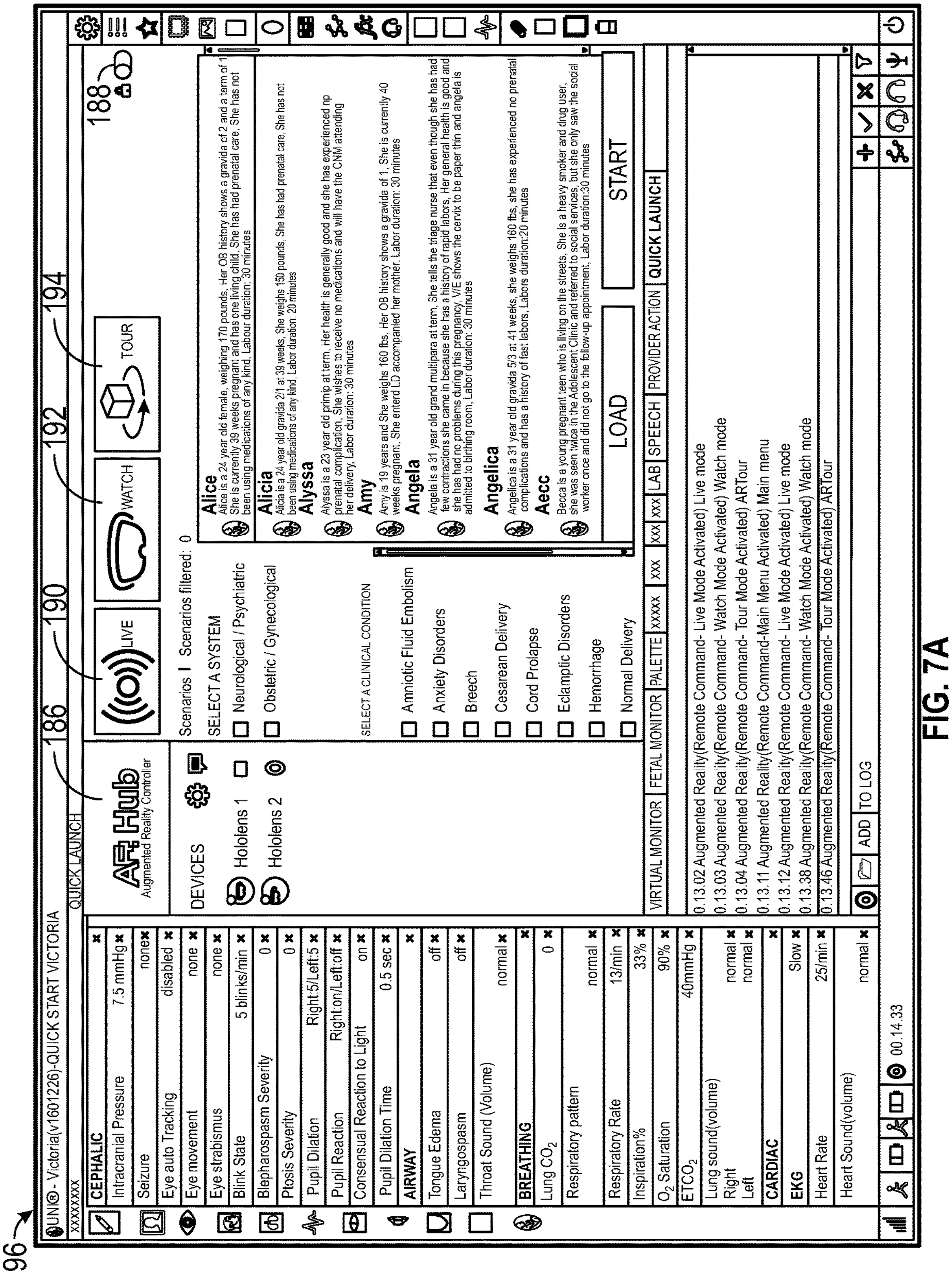
FIG. 7A is a graphical illustration of a control software of the augmented reality system of FIGS. 1 and/or 5, the control software including an augmented reality hub according to one or more embodiments of the present disclosure.
Figure 7B:
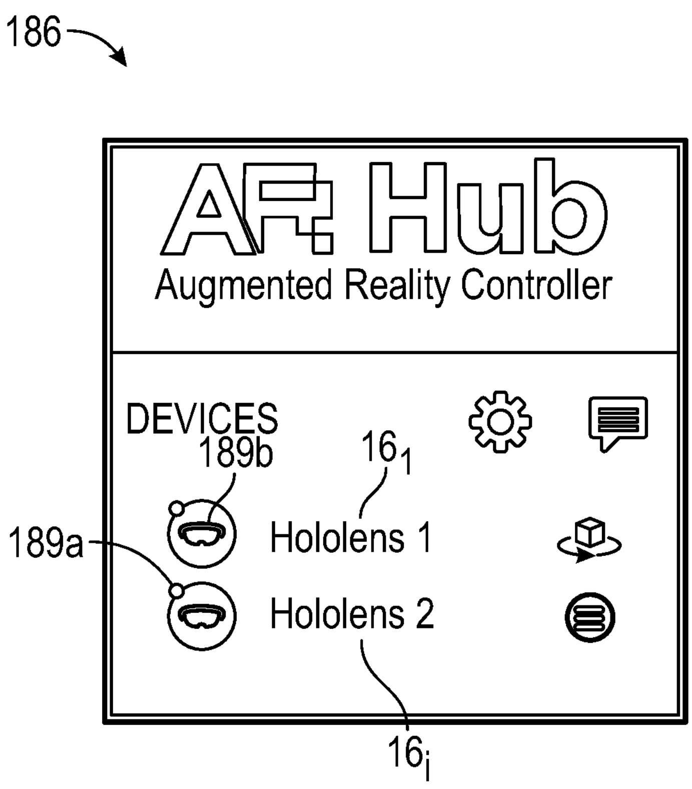
FIG. 7B is a graphical illustration of a portion of the augmented reality hub of FIG. 7A according to one or more embodiments of the present disclosure.
Figure 7C:
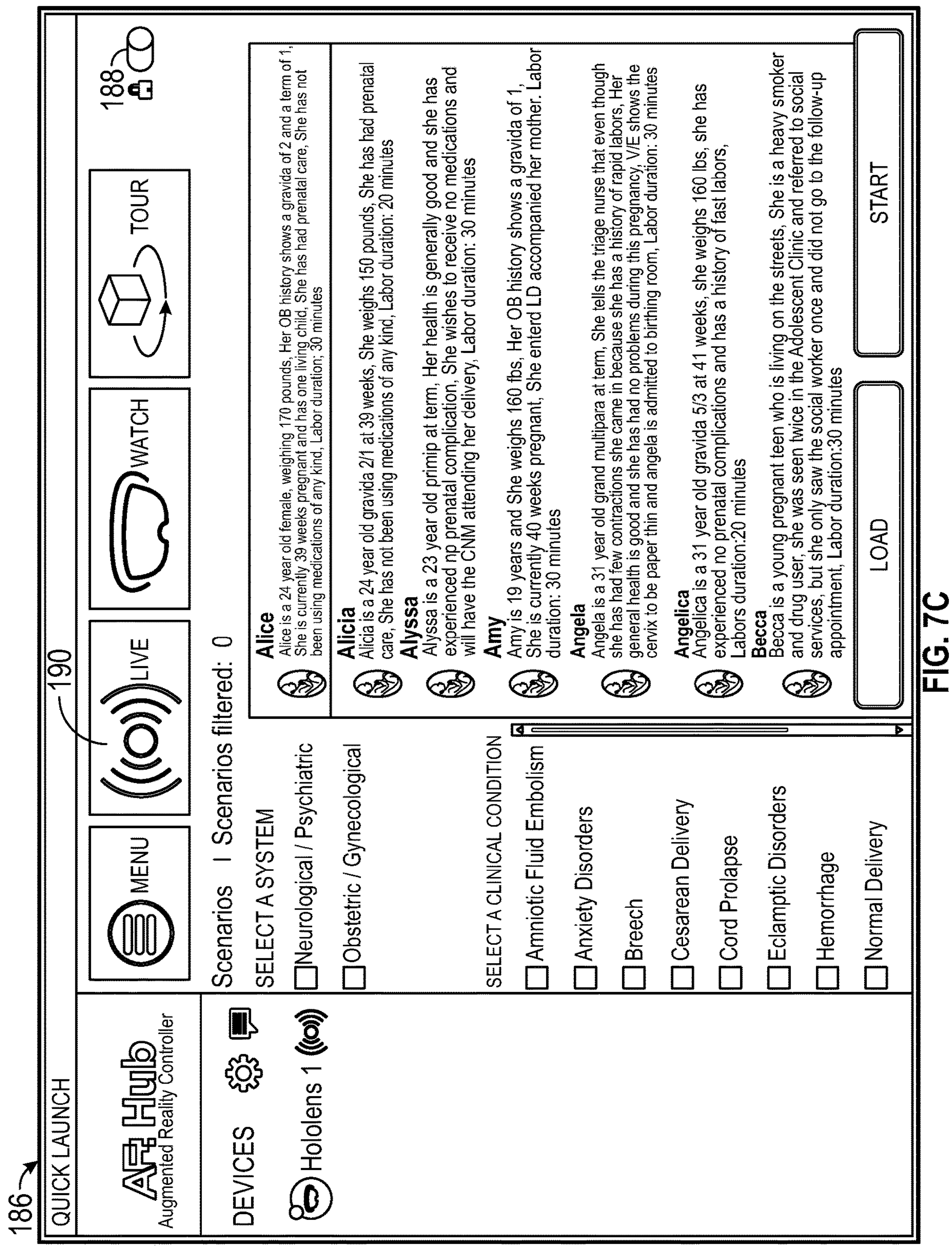
FIG. 7C is a graphical illustration of a live mode of the augmented reality hub of FIG. 7A according to one or more embodiments of the present disclosure.
Figure 7D:
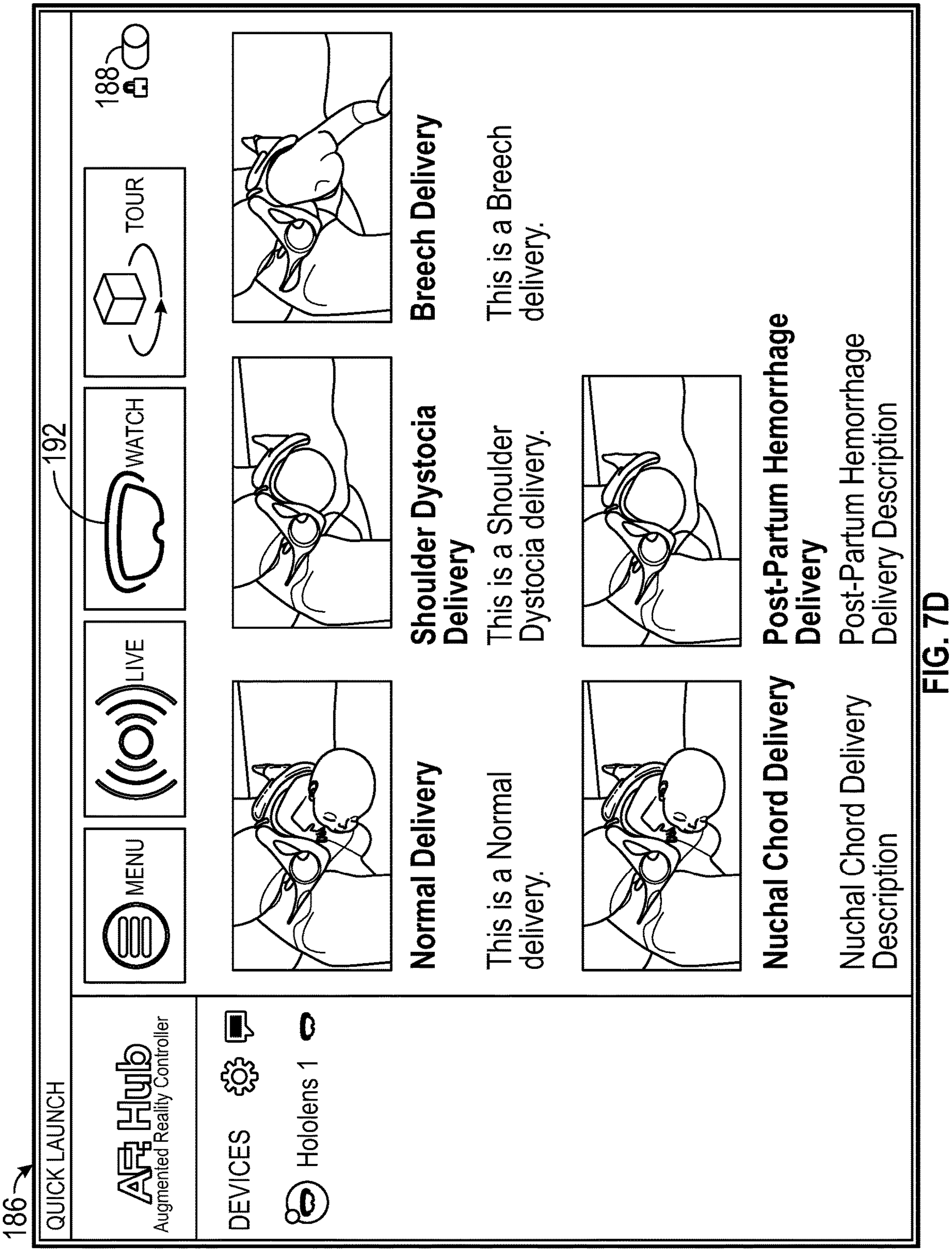
FIG. 7D is a graphical illustration of a watch mode of the augmented reality hub of FIG. 7A according to one or more embodiments of the present disclosure.
Figure 7E:
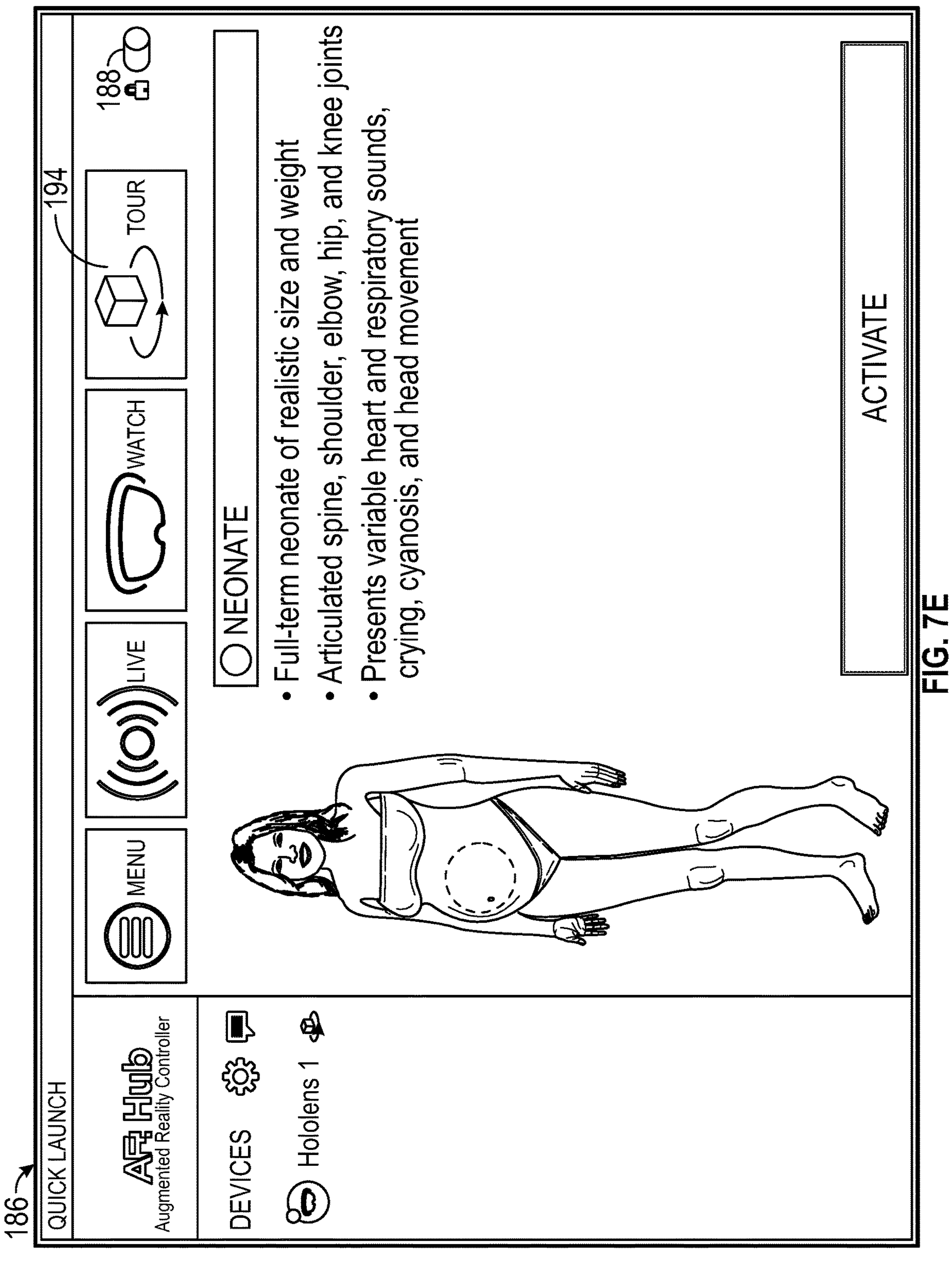
FIG. 7E is a graphical illustration of a tour mode of the augmented reality hub of FIG. 7A according to one or more embodiments of the present disclosure.

In an embodiment as illustrated in FIGS. 7A-7E, the unified simulator control software 96 includes an AR hub 186 configured to control at least some of the features in the AR application 98, which application runs the AR headset devices $\mathbf{16}_{1\text{-}i}$. As shown in FIG. 7A, the AR hub 186 provides feedback regarding the connectivity and current status of each AR headset device $\mathbf{16}_{1\text{-}i}$ connected to the unified simulator control software 96. Moreover, the AR hub 186 allows an instructor to take full control of any connected AR headset device $\mathbf{16}_{1, 2, 3, \textit{or } i}$ by selecting a "lock mode" button 188 (shown in the upper right corner of FIG. 7A). As a result, each AR headset device $\mathbf{16}_{1\text{-}i}$ is operable in two different modalities (i.e., instructor controlled and participant controlled). An example of feedback relating to the AR headset devices $\mathbf{16}_{1, 2, 3, \textit{and/or } i}$ is shown in FIG. 7B and includes connectivity information 189*a* as well as icon feedback 189*b* of the current mode in which each of the AR headset devices $\mathbf{16}_{1\text{-}i}$ is operating (e.g., live mode 102, watch mode 104, tour mode 106, or setup mode 108). As shown in FIG. 7A, similarly to the obstetric AR module 100 accessible via the AR application 98, the AR hub 186 includes a live mode 190, a watch mode 192, and a tour mode 194. In the live mode 190 of the AR hub 186, as shown in FIG. 7C, the instructor may select a particular scenario and run it live on both the manikin (e.g., the physical anatomic model 12 and/or 44) and all of the connected AR headset devices $16_{1-i}$. In the watch mode 192 of the AR hub 186, as shown in FIG. 7D, the instructor may select a video clip from the unified simulator control software 96 and have all connected AR headset devices $16_{1-i}$ simultaneously watch an instructional video. Finally, in the tour mode 194 of the AR hub 186, as shown in FIG. 7E, the instructor may provide a general overview of the manikin to all connected AR headset devices $16_{1-i}$ by selecting different regions of the standing hologram 160 of the manikin (e.g., the maternal manikin 46) and activating the selected regions on all connected AR headset devices $16_{1-i}$.

Figure 8:
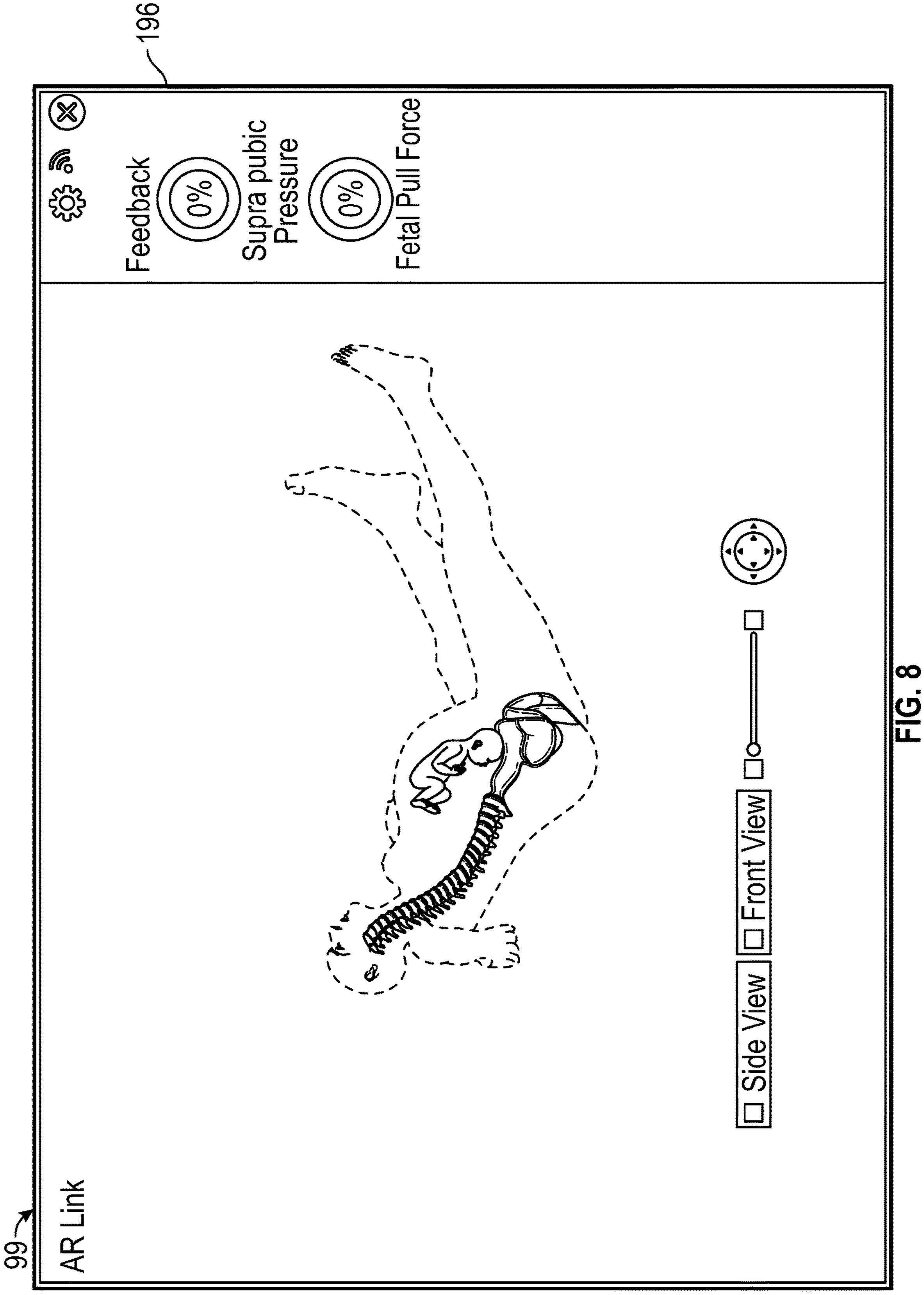
FIG. 8 is a graphical illustration of a linking software of the augmented reality system of FIGS. 1 and/or 5 according to one or more embodiments of the present disclosure.

In an embodiment, as illustrated in FIG. 8 with continuing reference to FIG. 5, the computing device 14" may include the AR link software 99 to allow participants that do not have one of the AR headset devices $16_{1-i}$ to still view the 3D animations of, for example, the live mode 190 during a particular scenario. An example of a graphical output 196 of the AR link software 99 is shown in FIG. 8. In some embodiments, the AR link software 99 is a standalone desktop application including features similar to those of the AR application 98 (which runs the AR headset devices $16_{1-i}$). In some embodiments, the AR link software 99 establishes connectivity with the unified simulator control software 96 on the computing device 14 via Transmission Control Protocol/Internet Protocol ("TC/PIP") over the network 20. In some embodiments, at least a portion of the AR link software 99 runs on the computing device 14.

In an exemplary embodiment, as illustrated in FIGS. 9A-9E, the obstetric AR module 100 is configured to create real-time visualization of the fetus and inner obstetric anatomy (e.g., the virtual fetal anatomy 56 and the internal virtual structures 58 of the virtual maternal anatomy 54) in lock step with the progress of a selected birthing scenario. For example, the fetus position and rotation may be animated together with the rest of the obstetric anatomy to complement a real-time birthing simulation using the manikin (e.g., the physical anatomic model 44) and the unified simulator control software 96. Specifically, obstetric animations are rendered in real-time on the AR headset devices $16_1$using a game engine 198 (e.g., Unity® 3D software) of the present disclosure. An example of the game engine 198 is shown diagrammatically in FIG. 9A, which illustrates the animation and rendering process utilized by the obstetric AR module 100.

Figure 9A:
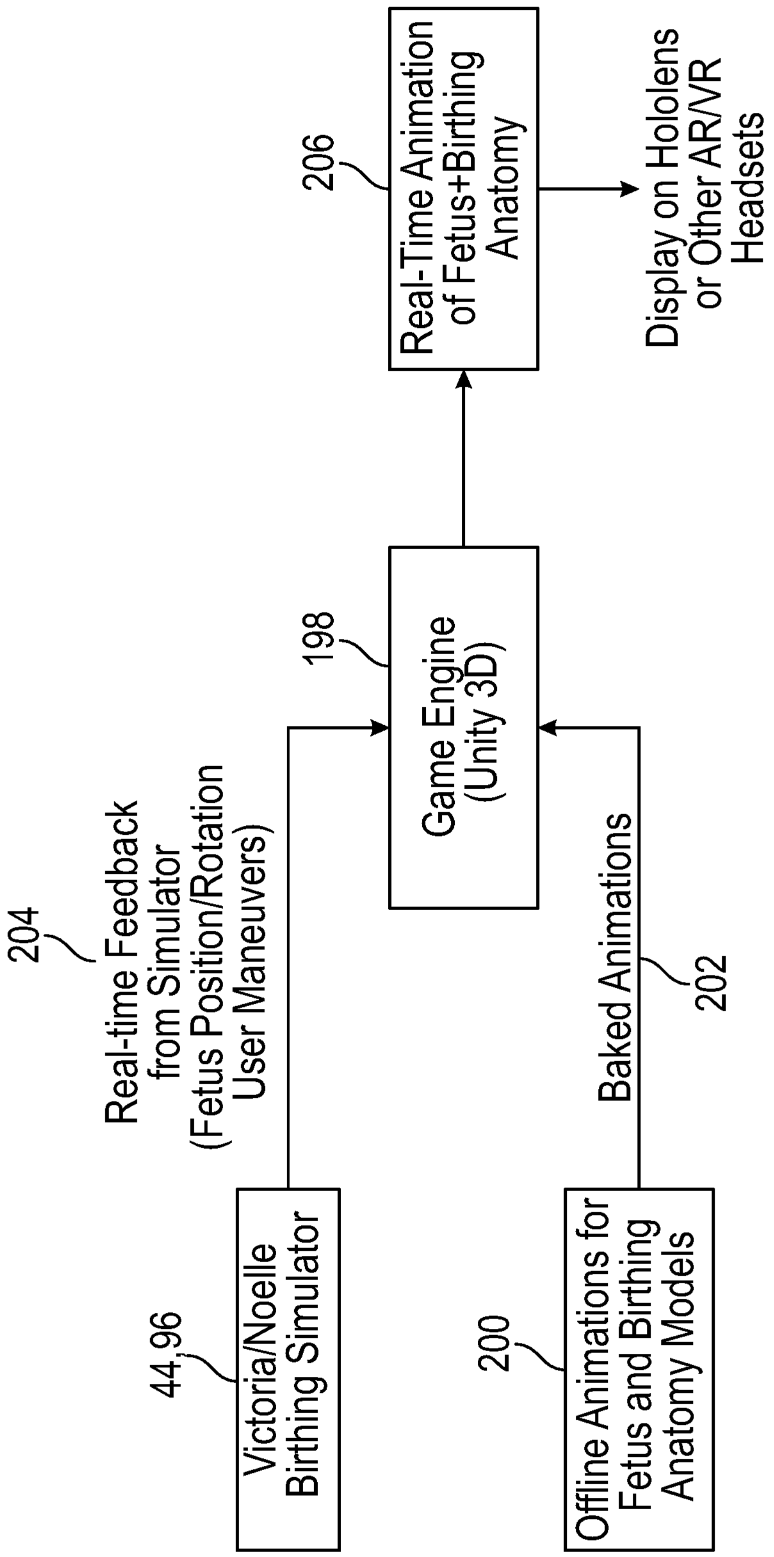
FIG. 9A is a flow diagram of a method of generating a real-time holographic animation of a birthing process using the augmented reality system of FIGS. 1 and/or 5 according to one or more embodiments of the present disclosure.
Figure 9B:
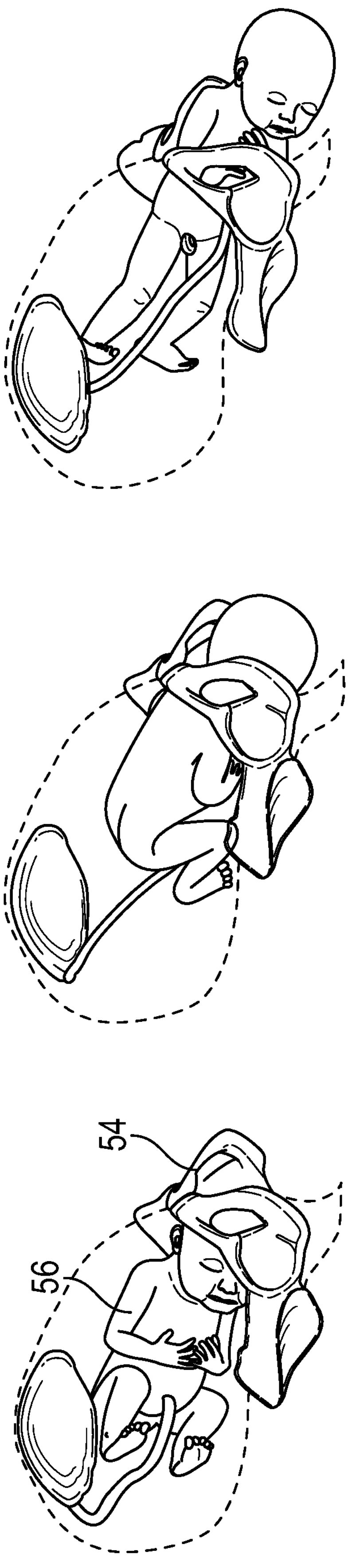
FIG. 9B is a graphical illustration of the birthing process of FIG. 9A according to one or more embodiments of the present disclosure.

To ensure that animations are realistic, anatomically accurate, and renderable in real-time, the animations are first created offline using a professional animation software (e.g., Autodesk® Maya® 3D software, Blender™ 3D software, another 3D software, or the like), as indicated by the reference numeral 200. Specifically, the offline animations are created using 3D animation software depicting the fetus in the correct pose (e.g., legs bent in fetal position, legs extended, etc.) corresponding to the position of the fetus during a particular stage of labor. Example orientations of the fetus during the birthing process are illustrated in FIG. 9B, together with the rest of the obstetric anatomy. In particular, as shown in FIG. 9B, the fetus undergoes both translation and rotation as the manikin (e.g., the maternal manikin 46) progressed through labor. The animations created offline are then imported into the game engine 198, as indicated by the arrow 202.

Figure 9C:
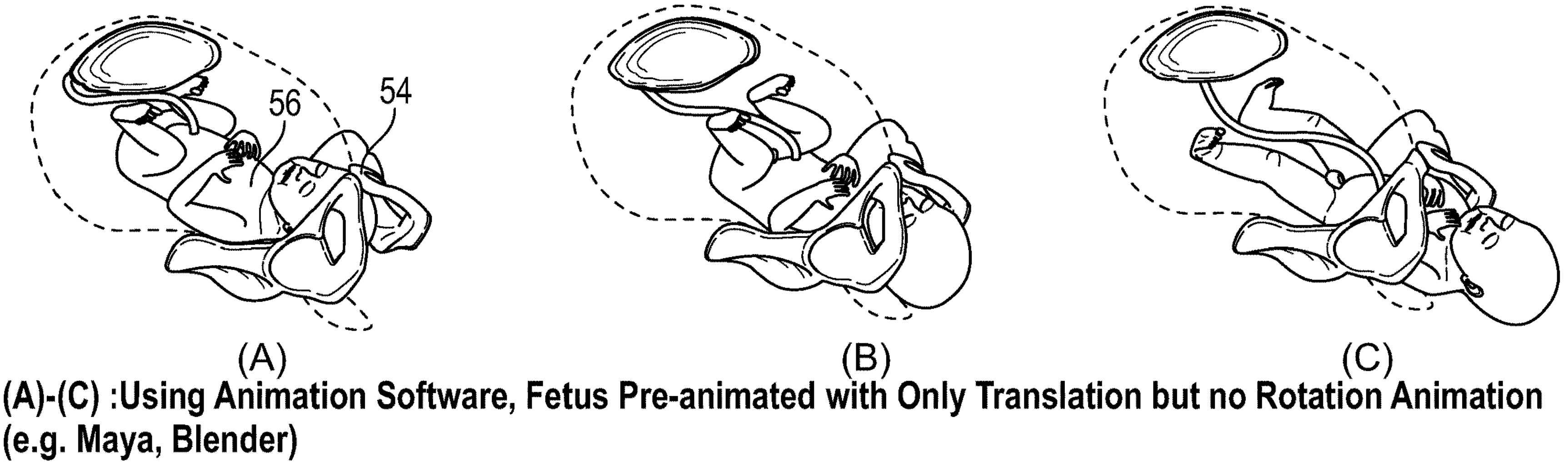
FIG. 9C is a graphical illustration of a portion of the method of FIG. 9A according to one or more embodiments of the present disclosure.
Figure 9C:
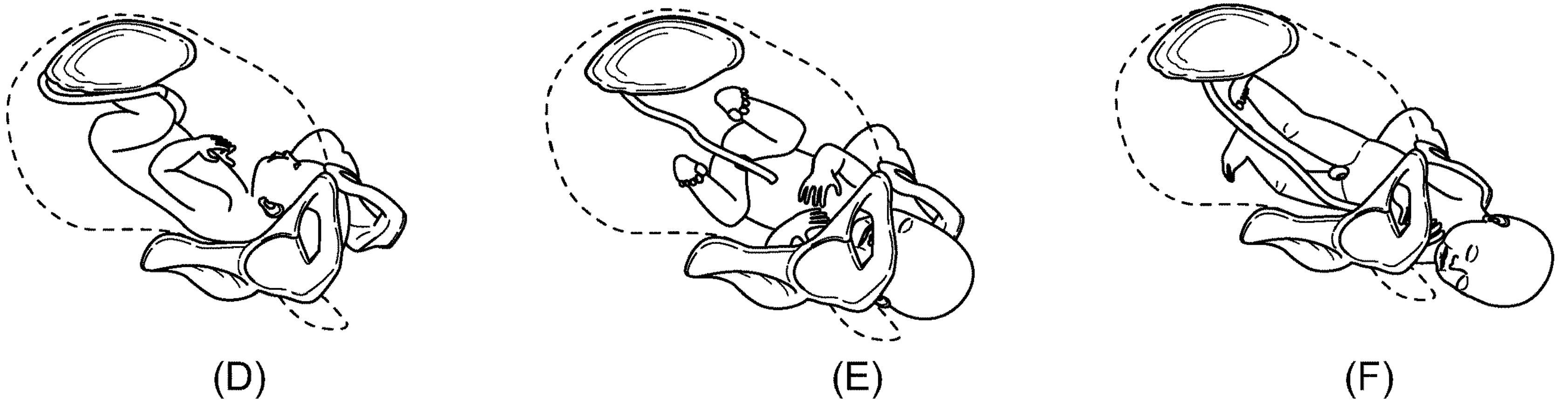
Figure 9D:
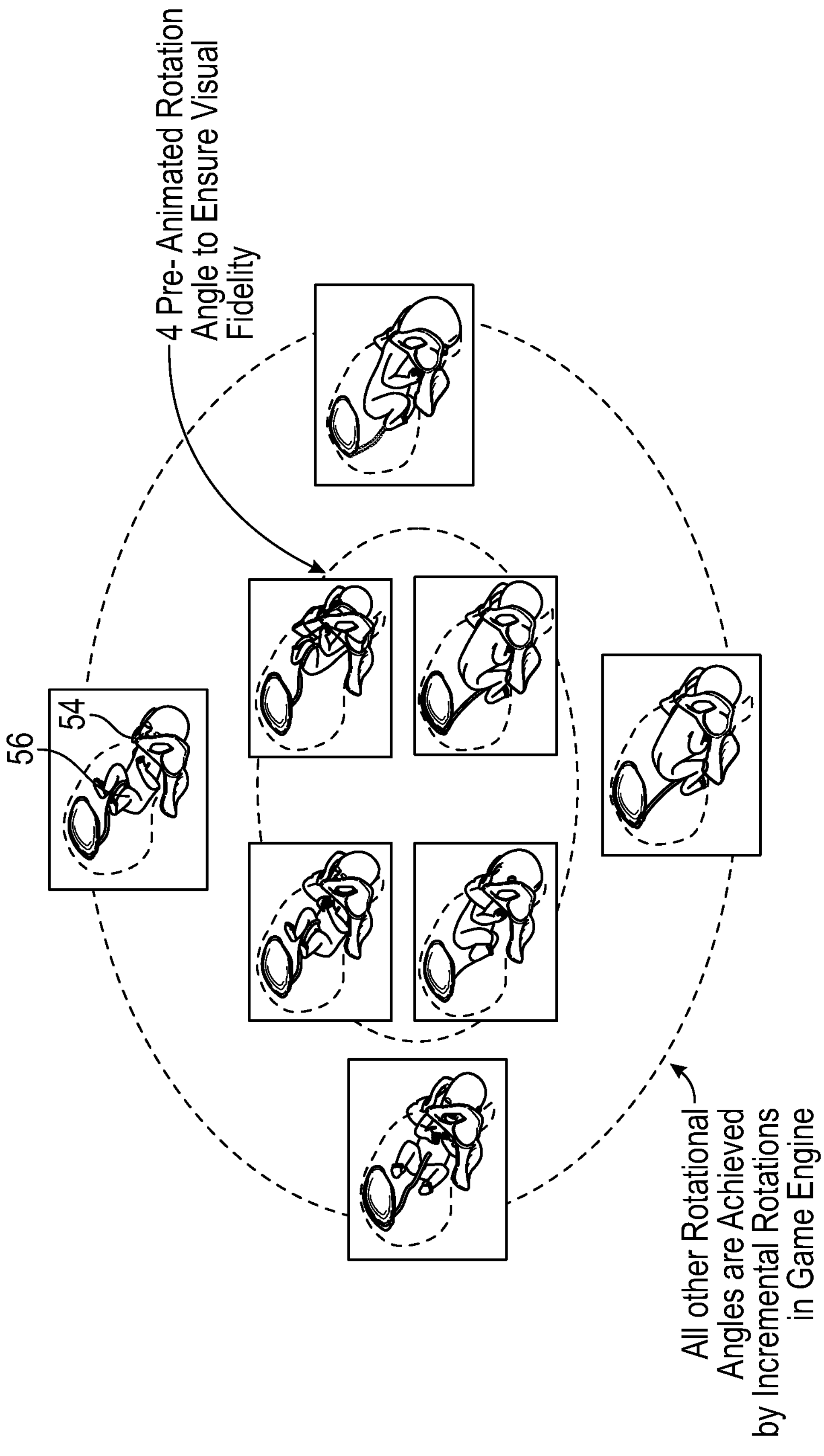
FIG. 9D is a graphical illustration of another portion of the method of FIG. 9A according to one or more embodiments of the present disclosure.

The game engine 198 then modifies the imported animations to match the position and rotation of the fetus during the birthing scenario. Specifically, the modifications made to the imported animations by the game engine 198 are based on real-time feedback from the birthing simulator (e.g., the physical anatomic model 44 and/or the unified simulator control software 96), as indicated by the arrow 204 in FIG. 9A, to impart the correct rotation to the pre-animated fetus pose. FIG. 9C depicts this two-step animation process. In particular, parts (A), (B), and (C) of FIG. 9C illustrate the first step of using the animation software to pre-animate the fetus with only translation and no rotation animation. Parts (D), (E), and (F) of FIG. 9C illustrate the second step of creating the desired rotation in real-time by rotating the pre-animated models using the game engine 198. In some embodiments, this two-step animation process results in high visual fidelity, anatomical accuracy, and high frame rates (which are required for real-time rendering of AR images). The game engine 198 then outputs a real-time animation of the fetus and the obstetric anatomy based on the pre-animated fetus poses 200 and the real-time feedback 204 from the birthing simulator, as indicated diagrammatically in FIG. 9A by the reference numeral 206. In some embodiments, the real-time animation of the fetus and the obstetric anatomy is then displayed on the AR headset device 16.

Because the angular rotation of the fetus can vary from 0 to 360 degrees, to ensure high visual fidelity, in some embodiments, fetus poses are created for four different angular positions (in the offline 3D animation software 200) as a function of labor progression. The various fetus poses for all other angular orientations are created on demand by the game engine 198 in real-time to match the feedback 204 from the birthing simulator. An example of this process is illustrated diagrammatically in FIG. 9D.

Figure 9E:
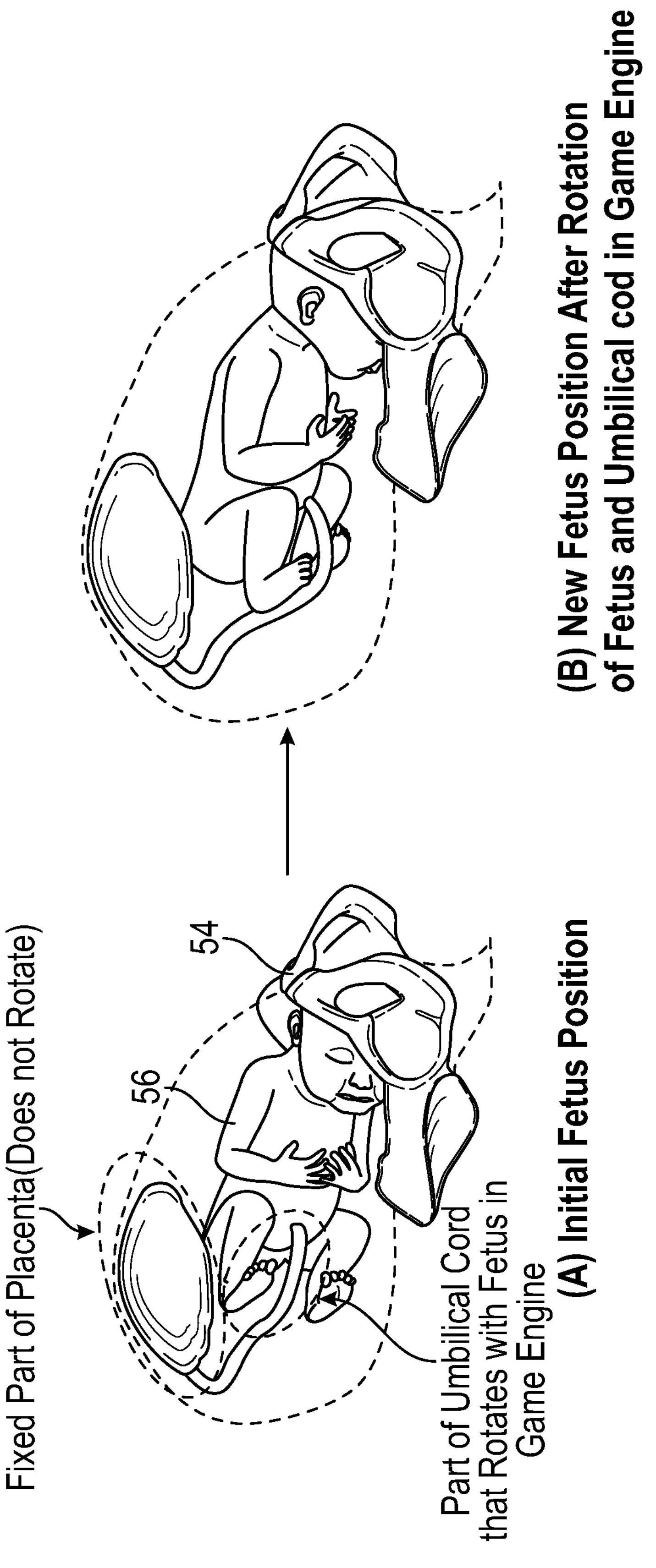
FIG. 9E is a graphical illustration of yet another portion of the method of FIG. 9A according to one or more embodiments of the present disclosure.

To ensure the placenta and umbilical cord remain attached to the fetus during rotation, the placenta is modeled with rotational and non-rotational parts. The rotational part allows the tip of the umbilical cord to stay attached to the fetus while the fetus is animated to rotate in the birth canal. An example of this process is illustrated diagrammatically in FIG. 9E. Specifically, part (A) of FIG. 9E shows an initial position of the fetus with the non-rotational part of the placenta being connected to the wall of the amniotic sac and the rotational part of the placenta (e.g., the umbilical cord) being connected to the fetus. In contrast, part (B) of FIG. 9E shows a rotated position of the fetus in which the tip of the umbilical cord remains attached to the fetus.

Figure 10A:
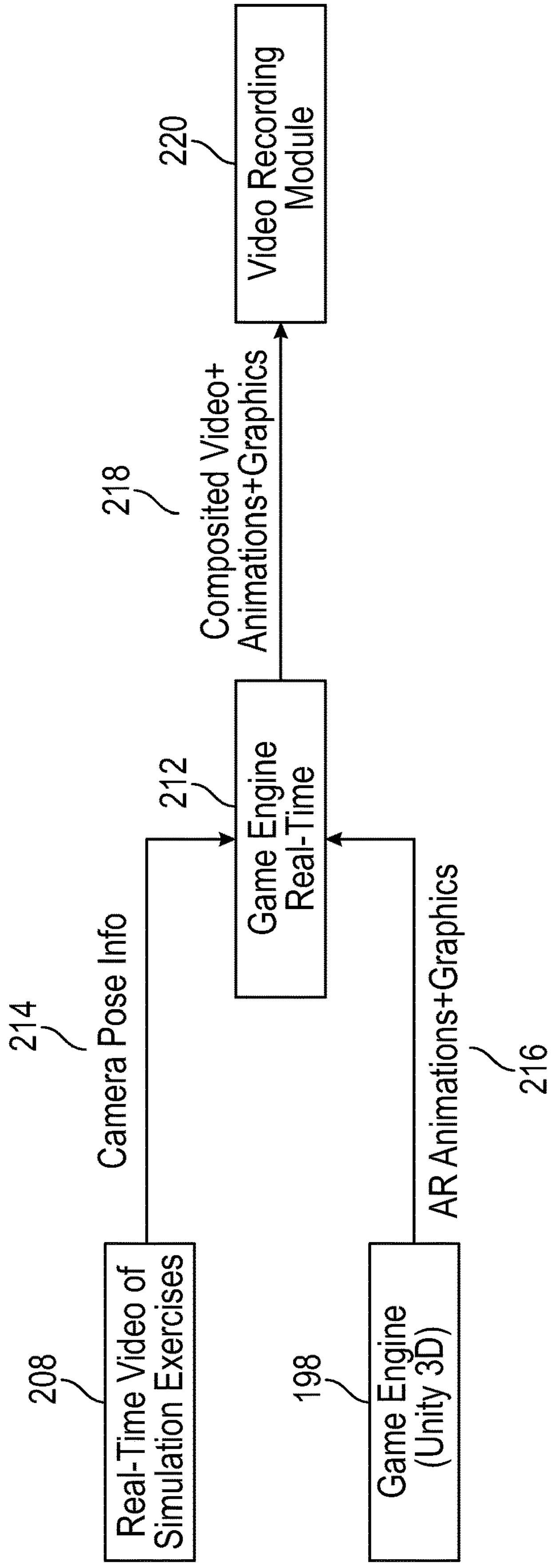
FIG. 10A is a diagrammatic illustration of a method of overlaying the real-time holographic animation of the birthing process generated by the method of FIG. 9A on a real-time video feed according to one or more embodiments of the present disclosure.
Figure 10B:
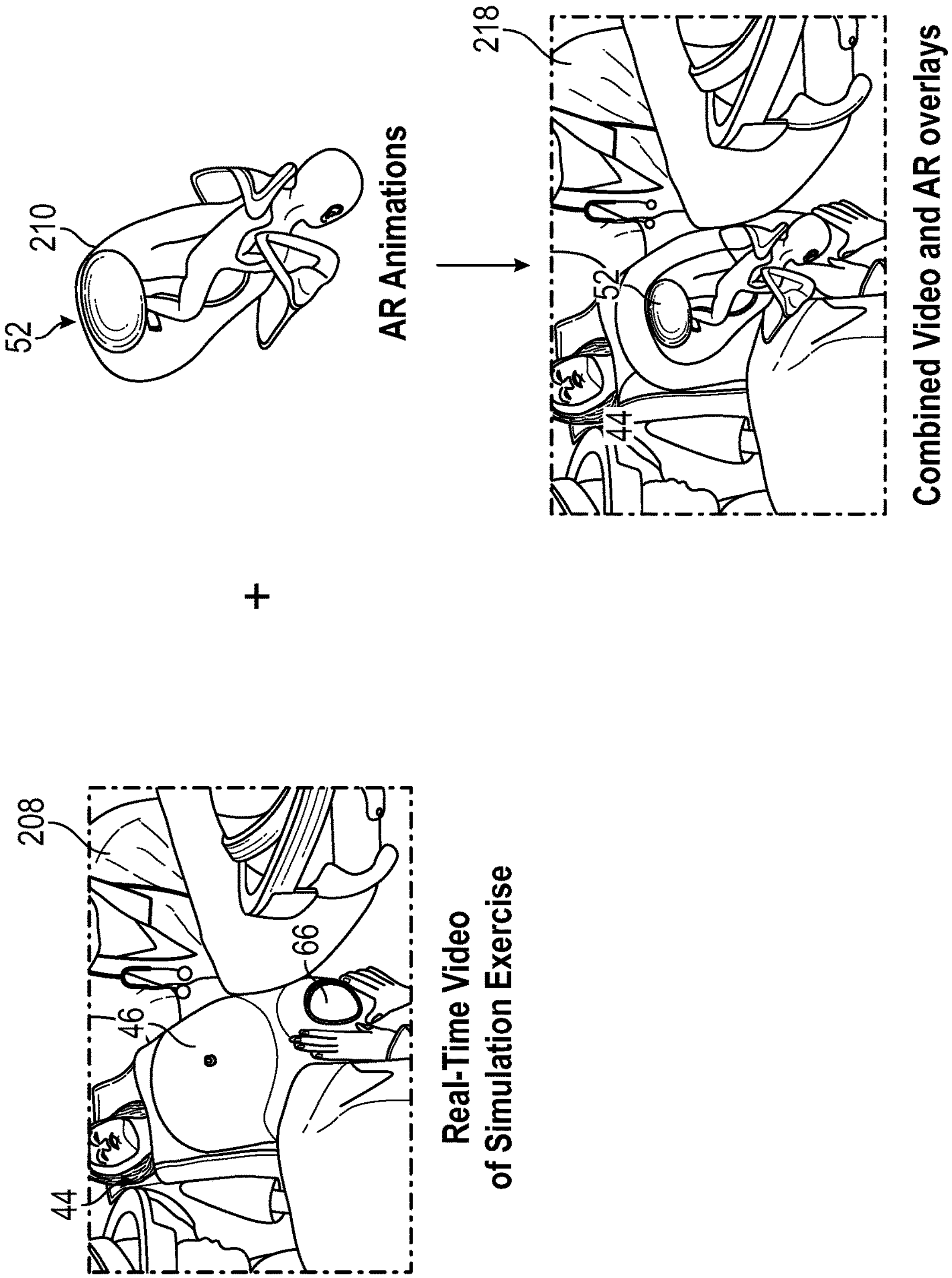
FIG. 10B is a graphical illustration of the method of FIG. 10A according to one or more embodiments of the present disclosure.

In an embodiment, as illustrated in FIGS. 10A-10B, a real-time video 208 of a simulation exercise may be overlaid with holographic AR animations 210 and/or other computer generated graphics. The AR animations 210 (shown in FIG. 10B) and graphics are rendered in real-time inside a real-time game engine 212 from a position and perspective that matches with the real-time video 208, as shown in FIG. 10B. Specifically, the real-time video 208 of the simulation exercises is fed into the real-time game engine 212 together with real-time camera pose data (i.e., position and orientation), as indicated by the arrow 214 in FIG. 10A. Additionally, the AR animations and graphics generated by the game engine 198 (or a similar game engine) are fed into the real-time game engine 212, as indicated by the arrow 216 in FIG. 10A. The real-time game engine 212 then creates a composite video of the real-time video 208 of the simulation exercise together with the AR animations and graphics, as indicated by the arrow 218 in FIG. 10A. Finally, the real-time game engine 212 sends the composite video to a video recording module 220. Examples of the real-time video 208 of the simulation exercise, the AR animations 210 and graphics, and the composite video 218 created by the real-time game engine 212 are illustrated in FIG. 10B. Specifically, as shown in FIG. 10B, the real-time game engine 212 can be used to overlay the virtual anatomic model 52 on the physical anatomic model 44. The real-time game engine 212 is equally suited to overlay the virtual anatomic model 36 on the physical anatomic model 12.

In some embodiments, a plurality of instructions, or computer program(s), are stored on a non-transitory computer readable medium, the instructions or computer program(s) being accessible to, and executable by, one or more processors. In some embodiments, the one or more processors execute the plurality of instructions (or computer program(s)) to operate in whole or in part the above-described illustrative embodiments. In some embodiments, the one or more processors are part of the computing device 14 (or another computing device of the present disclosure), one or more other computing devices, or any combination thereof. In some embodiments, the non-transitory computer readable medium is part of the computing device 14, one or more other computing devices, or any combination thereof.

Figure 11:
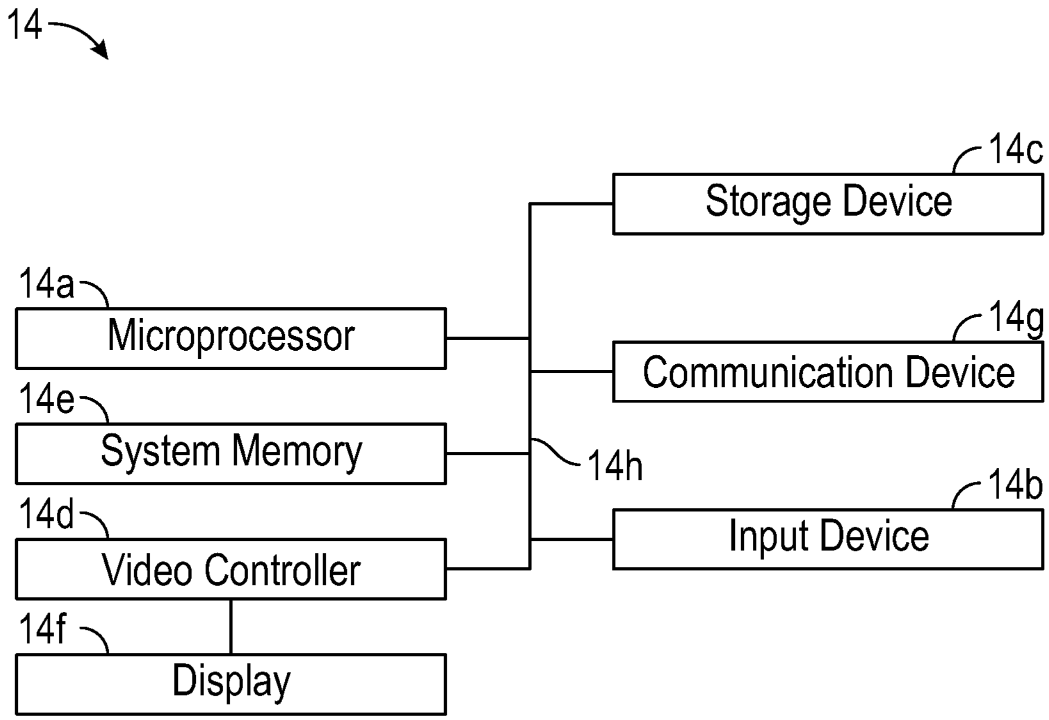
FIG. 11 is a diagrammatic illustration of a computing device for implementing one or more embodiments of the present disclosure.

Referring to FIG. 11 with continuing reference to FIGS. 1-4, an embodiment of the computing device 14, 14', and/or 14" for implementing one or more embodiments of one or more of the above-described networks, elements, methods and/or steps, and/or any combination thereof, is depicted. The computing device 14, 14', and/or 14" includes a microprocessor 14*a*, an input device 14*b*, a storage device 14*c*, a video controller 14*d*, a system memory 14*e*, a display 14*f*, and a communication device 14*g* all interconnected by one or more buses 14*h*. In some embodiments, the storage device 14*c* may include a floppy drive, hard drive, CD-ROM, optical drive, any other form of storage device and/or any combination thereof. In some embodiments, the storage device 14*c* may include, and/or be capable of receiving, a floppy disk, CD-ROM, DVD-ROM, or any other form of computer-readable medium that may contain executable instructions. In some embodiments, the communication device 14*g* may include a modem, network card, or any other device to enable the computing device to communicate with other computing devices. In some embodiments, any computing device represents a plurality of interconnected (whether by intranet or Internet) computer systems, including without limitation, personal computers, mainframes, PDAs, smartphones and cell phones.

The computing device can send a network message using proprietary protocol instructions to render 3D models and/or medical data. The link between the computing device and the display unit and the synchronization between the programmed state of physical manikin and the rendering data/3D model on the display unit of the present invention facilitate enhanced learning experiences for users. In this regard, multiple display units can be used simultaneously by multiple users to show the same 3D models/data from different points of view of the same manikin(s) to facilitate uniform teaching and learning, including team training aspects.

In some embodiments, one or more of the components of the above-described illustrative embodiments include at least the computing device 14, 14', and/or 14" and/or components thereof, and/or one or more computing devices that are substantially similar to the computing device 14, 14', and/or 14" and/or components thereof. In some embodiments, one or more of the above-described components of the computing device 14, 14', and/or 14" include respective pluralities of same components.

In some embodiments, a computer system typically includes at least hardware capable of executing machine readable instructions, as well as the software for executing acts (typically machine-readable instructions) that produce a desired result. In some embodiments, a computer system may include hybrids of hardware and software, as well as computer sub-systems.

In some embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In some embodiments, hardware may include any physical device that is capable of storing machine-readable instructions, such as memory or other data storage devices. In some embodiments, other forms of hardware include hardware sub-systems, including transfer devices such as modems, modem cards, ports, and port cards, for example.

In some embodiments, software includes any machine code stored in any memory medium, such as RAM or ROM, and machine code stored on other devices (such as floppy disks, flash memory, or a CD ROM, for example). In some embodiments, software may include source or object code. In some embodiments, software encompasses any set of instructions capable of being executed on a computing device such as, for example, on a client machine or server.

In some embodiments, combinations of software and hardware could also be used for providing enhanced functionality and performance for certain embodiments of the present disclosure. In an illustrative embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In some embodiments, computer readable mediums include, for example, passive data storage, such as a random access memory (RAM) as well as semi-permanent data storage such as a compact disk read only memory (CD-ROM). One or more illustrative embodiments of the present disclosure may be embodied in the RAM of a computer to transform a standard computer into a new specific computing machine. In some embodiments, data structures are defined organizations of data that may enable an embodiment of the present disclosure. In an illustrative embodiment, a data structure may provide an organization of data, or an organization of executable code.

In some embodiments, any networks and/or one or more portions thereof, may be designed to work on any specific architecture. In an illustrative embodiment, one or more portions of any networks may be executed on a single computer, local area networks, client-server networks, wide area networks, internets, hand-held and other portable and wireless devices and networks.

In some embodiments, a database may be any standard or proprietary database software. In some embodiments, the database may have fields, records, data, and other database elements that may be associated through database specific software. In some embodiments, data may be mapped. In some embodiments, mapping is the process of associating one data entry with another data entry. In an illustrative embodiment, the data contained in the location of a character file can be mapped to a field in a second table. In some embodiments, the physical location of the database is not limiting, and the database may be distributed. In an illustrative embodiment, the database may exist remotely from the server, and run on a separate platform. In an illustrative embodiment, the database may be accessible across the Internet. In some embodiments, more than one database may be implemented.

In some embodiments, a plurality of instructions stored on a non-transitory computer readable medium may be executed by one or more processors to cause the one or more processors to carry out or implement in whole or in part the above-described operation of each of the above-described illustrative embodiments of the AR system 10, the method 84, and/or any combination thereof. In some embodiments, such a processor may include the microprocessor 14*a*, and such a non-transitory computer readable medium may include the storage device 14*c*, the system memory 14*e*, or a combination thereof. Moreover, the computer readable medium may be distributed among one or more components of the AR system 10, including, but not limited to, the physical anatomic model 12 or 44, the AR headset device 16, the tracking system 18, the instrument 28, or any combination thereof. In some embodiments, such a processor may execute the plurality of instructions in connection with a virtual computer system. In some embodiments, such a plurality of instructions may communicate directly with the one or more processors, and/or may interact with one or more operating systems, middleware, firmware, other applications, and/or any combination thereof, to cause the one or more processors to execute the instructions.

In a first aspect, the present disclosure introduces an augmented reality system, including a physical anatomic model; a display unit via which a user is adapted to receive a first optic feedback and a second optic feedback, the first optic feedback emanating from the physical anatomic model and passing through the display unit, and the second optic feedback emanating from the display unit and including a virtual anatomic model; a tracking system adapted to track a position and an orientation of the display unit; and a computing device adapted to: receive a first signal from the tracking system relating to the position and the orientation of the display unit, and send a second signal to the display unit to cause the display unit to overlay the second optic feedback on the first optic feedback, the second signal being based on the first signal. In some embodiments, the second optic feedback further includes ancillary virtual graphics, the ancillary virtual graphics including one or more of: medical data, instructional steps, expert demonstrations, didactic content, and exigent circumstances. In some embodiments, the physical anatomic model includes a manikin, the manikin including external physical features, and the external physical features including physical representations of one or more external characteristics associated with a natural human; and the virtual anatomic model includes virtual anatomy, the virtual anatomy including internal virtual structures, and the internal virtual structures including virtual representations of one or more internal characteristics associated with the natural human. In some embodiments, the computing device is further adapted to co-register the virtual anatomy with the manikin to ensure an accurate spatial relationship therebetween; and the second signal is further based on the co-registering of the virtual anatomy with the manikin. In some embodiments, the virtual anatomy further includes external virtual features, the external virtual features including virtual representations of one or more external characteristics associated with the natural human; and the external virtual features of the virtual anatomy simulate some external characteristics associated with the natural human, and the external physical features of the manikin simulate other external characteristics associated with the natural human. In some embodiments, the manikin further includes internal physical structures, the internal physical structures including physical representations of one or more internal characteristics associated with the natural human; and the internal physical structures of the manikin simulate some internal characteristics associated with the natural human, and the internal virtual structures of the virtual anatomy simulate other internal characteristics associated with the natural human. In some embodiments, the physical anatomic model includes a maternal manikin, the maternal manikin including first external physical features, and the first external physical features including physical representations of one or more external characteristics associated with a natural mother; and the virtual anatomic model includes virtual fetal anatomy, the virtual fetal anatomy including first external virtual features, and the first external virtual features including virtual representations of one or more external characteristics associated with a natural fetus. In some embodiments, the computing device is further adapted to co-register the virtual fetal anatomy with the maternal manikin to ensure an accurate spatial relationship therebetween; and the second signal is further based on the co-registering of the virtual fetal anatomy with the maternal manikin. In some embodiments, the physical anatomic model further includes a fetal manikin contained within the maternal manikin, the fetal manikin including second external physical features, and the second external physical features including physical representations of one or more external characteristics associated with the natural fetus; and the second external physical features of the fetal manikin simulate some external characteristics associated with the natural fetus, and the first external virtual features of the virtual fetal anatomy simulate other characteristics associated with the natural fetus. In some embodiments, the tracking system is further adapted to track a position and an orientation of the fetal manikin relative to the maternal manikin; the computing device is further adapted to: co-register the virtual fetal anatomy with the fetal manikin to ensure an accurate spatial relationship therebetween; and receive a third signal relating to the position and the orientation of the fetal manikin relative to the maternal manikin from the tracking system; and the second signal is further based on the third signal and the co-registering of the virtual fetal anatomy with the fetal manikin. In some embodiments, the virtual anatomic model further includes virtual maternal anatomy, the virtual maternal anatomy including internal virtual structures, and the internal virtual structures including virtual representations of one or more internal characteristics associated with the natural mother. In some embodiments, the computing device is further adapted to co-register the virtual fetal anatomy and the virtual maternal anatomy with the maternal manikin to ensure an accurate spatial relationship therebetween; and the second signal is further based on the co-registering of the virtual fetal anatomy and the virtual maternal anatomy with the maternal manikin. In some embodiments, the maternal manikin further includes internal physical structures, the internal physical structures including physical representations of one or more internal characteristics associated with the natural mother; and the internal physical structures of the maternal manikin simulate some internal characteristics associated with the natural mother, and the internal virtual structures of the virtual maternal anatomy simulate other internal characteristics associated with the natural mother. In some embodiments, the virtual anatomic model further includes virtual maternal anatomy, the virtual maternal anatomy including second external virtual features, and the second external virtual features including virtual representations of one or more external characteristics of the natural mother; and the second external virtual features of the virtual maternal anatomy simulate some external characteristics associated with the natural mother, and the first external physical features of the maternal manikin simulate other external characteristics associated with the natural mother.

In a second aspect, the present disclosure introduces a method, including viewing a first optic feedback that emanates from a physical anatomic model and passes through a display unit; tracking, using a tracking system, a position and an orientation of the display unit; receiving, using a computing device, a first signal from the tracking system relating to the position and the orientation of the display unit; sending, using the computing device, a second signal to the display unit to cause the display unit to overlay a second optic feedback on the first optic feedback, the second signal being based on the first signal; and viewing the second optic feedback, wherein the second optic feedback emanates from the display unit and includes a virtual anatomic model. In some embodiments, the second optic feedback further includes ancillary virtual graphics, the ancillary virtual graphics including one or more of: medical data, instructional steps, expert demonstrations, didactic content, and exigent circumstances. In some embodiments, the physical anatomic model includes a manikin, the manikin including external physical features, and the external physical features including physical representations of one or more external characteristics associated with a natural human; and the virtual anatomic model includes virtual anatomy, the virtual anatomy including internal virtual structures, and the internal virtual structures including virtual representations of one or more internal characteristics associated with the natural human. In some embodiments, the method further includes co-registering, using the computing device, the virtual anatomy with the manikin to ensure an accurate spatial relationship therebetween; wherein the second signal is further based on the co-registering of the virtual anatomy with the manikin. In some embodiments, the virtual anatomy further includes external virtual features, the external virtual features including virtual representations of one or more external characteristics associated with the natural human; and the external virtual features of the virtual anatomy simulate some external characteristics associated with the natural human, and the external physical features of the manikin simulate other external characteristics associated with the natural human. In some embodiments, the manikin further includes internal physical structures, the internal physical structures including physical representations of one or more internal characteristics associated with the natural human; and the internal physical structures of the manikin simulate some internal characteristics associated with the natural human, and the internal virtual structures of the virtual anatomy simulate other internal characteristics associated with the natural human. In some embodiments, the physical anatomic model includes a maternal manikin, the maternal manikin including first external physical features, and the first external physical features including physical representations of one or more external characteristics associated with a natural mother; and the virtual anatomic model includes virtual fetal anatomy, the virtual fetal anatomy including first external virtual features, and the first external virtual features including virtual representations of one or more external characteristics associated with a natural fetus. In some embodiments, the method further includes co-registering, using the computing device, the virtual fetal anatomy with the maternal manikin to ensure an accurate spatial relationship therebetween; wherein the second signal is further based on the co-registering of the virtual fetal anatomy with the maternal manikin. In some embodiments, the physical anatomic model further includes a fetal manikin contained within the maternal manikin, the fetal manikin including second external physical features, and the second external physical features including physical representations of one or more external characteristics associated with the natural fetus; and the second external physical features of the fetal manikin simulate some external characteristics associated with the natural fetus, and the first external virtual features of the virtual fetal anatomy simulate other characteristics associated with the natural fetus. In some embodiments, the method further includes tracking, using the tracking system, a position and an orientation of the fetal manikin relative to the maternal manikin; co-registering, using the computing device, the virtual fetal anatomy with the fetal manikin to ensure an accurate spatial relationship therebetween; and receiving, using the computing device, a third signal from the tracking system relating to the position and the orientation of the fetal manikin relative to the maternal manikin; wherein the second signal is further based on the third signal and the co-registering of the virtual fetal anatomy with the fetal manikin. In some embodiments, the virtual anatomic model further includes virtual maternal anatomy, the virtual maternal anatomy including internal virtual structures, and the internal virtual structures including virtual representations of one or more internal characteristics associated with the natural mother. In some embodiments, the method further includes co-registering, using the computing device, the virtual fetal anatomy and the virtual maternal anatomy with the maternal manikin to ensure an accurate spatial relationship therebetween; wherein the second signal is further based on the co-registering of the virtual fetal anatomy and the virtual maternal anatomy with the maternal manikin. In some embodiments, the maternal manikin further includes internal physical structures, the internal physical structures including physical representations of one or more internal characteristics associated with the natural mother; and the internal physical structures of the maternal manikin simulate some internal characteristics associated with the natural mother, and the internal virtual structures of the virtual maternal anatomy simulate other internal characteristics associated with the natural mother. In some embodiments, the virtual anatomic model further includes virtual maternal anatomy, the virtual maternal anatomy including second external virtual features, and the second external virtual features including virtual representations of one or more external characteristics of the natural mother; and the second external virtual features of the virtual maternal anatomy simulate some external characteristics associated with the natural mother, and the first external physical features of the maternal manikin simulate other external characteristics associated with the natural mother.

In a third aspect, the present disclosure introduces an apparatus, including a non-transitory computer readable medium; and a plurality of instructions stored on the non-transitory computer readable medium and executable by one or more processors, the plurality of instructions including: instructions that cause the one or more processors to track, using a tracking system, a position and an orientation of a display unit; instructions that cause the one or more processors to receive a first signal from the tracking system relating to the position and the orientation of the display unit; and instructions that cause the one or more processors to send a second signal to the display unit to cause the display unit to overlay a first optic feedback on a second optic feedback, the second signal being based on the first signal; wherein the second optic feedback emanates from a physical anatomic model and passes through a display unit, and the first optic feedback emanates from the display unit and includes a virtual anatomic model. In some embodiments, the first optic feedback further includes ancillary virtual graphics, the ancillary virtual graphics including one or more of: medical data, instructional steps, expert demonstrations, didactic content, and exigent circumstances. In some embodiments, the physical anatomic model includes a manikin, the manikin including external physical features, and the external physical features including physical representations of one or more external characteristics associated with a natural human; and the virtual anatomic model includes virtual anatomy, the virtual anatomy including internal virtual structures, and the internal virtual structures including virtual representations of one or more internal characteristics associated with the natural human. In some embodiments, the plurality of instructions further include instructions that cause the one or more processors to co-register the virtual anatomy with the manikin to ensure an accurate spatial relationship therebetween; and the second signal is further based on the co-registering of the virtual anatomy with the manikin. In some embodiments, the virtual anatomy further includes external virtual features, the external virtual features including virtual representations of one or more external characteristics associated with the natural human; and the external virtual features of the virtual anatomy simulate some external characteristics associated with the natural human, and the external physical features of the manikin simulate other external characteristics associated with the natural human. In some embodiments, the manikin further includes internal physical structures, the internal physical structures including physical representations of one or more internal characteristics associated with the natural human; and the internal physical structures of the manikin simulate some internal characteristics associated with the natural human, and the internal virtual structures of the virtual anatomy simulate other internal characteristics associated with the natural human. In some embodiments, the physical anatomic model includes a maternal manikin, the maternal manikin including first external physical features, and the first external physical features including physical representations of one or more external characteristics associated with a natural mother; and the virtual anatomic model includes virtual fetal anatomy, the virtual fetal anatomy including first external virtual features, and the first external virtual features including virtual representations of one or more external characteristics associated with a natural fetus. In some embodiments, the plurality of instructions further include instructions that cause the one or more processors to co-register the virtual fetal anatomy with the maternal manikin to ensure an accurate spatial relationship therebetween; and the second signal is further based on the co-registering of the virtual fetal anatomy with the maternal manikin. In some embodiments, the physical anatomic model further includes a fetal manikin contained within the maternal manikin, the fetal manikin including second external physical features, and the second external physical features including physical representations of one or more external characteristics associated with the natural fetus; and the second external physical features of the fetal manikin simulate some external characteristics associated with the natural fetus, and the first external virtual features of the virtual fetal anatomy simulate other characteristics associated with the natural fetus. In some embodiments, the plurality of instructions further include: instructions that cause the one or more processors to track, using the tracking system, a position and an orientation of the fetal manikin relative to the maternal manikin; instructions that cause the one or more processors to co-register the virtual fetal anatomy with the fetal manikin to ensure an accurate spatial relationship therebetween; and instructions that cause the one or more processors to receive a third signal from the tracking system relating to the position and the orientation of the fetal manikin relative to the maternal manikin; and the second signal is further based on the third signal and the co-registering of the virtual fetal anatomy with the fetal manikin. In some embodiments, the virtual anatomic model further includes virtual maternal anatomy, the virtual maternal anatomy including internal virtual structures, and the internal virtual structures including virtual representations of one or more internal characteristics associated with the natural mother. In some embodiments, the plurality of instructions further include instructions that cause the one or more processors to co-register the virtual fetal anatomy and the virtual maternal anatomy with the maternal manikin to ensure an accurate spatial relationship therebetween; and the second signal is further based on the co-registering of the virtual fetal anatomy and the virtual maternal anatomy with the maternal manikin. In some embodiments, the maternal manikin further includes internal physical structures, the internal physical structures including physical representations of one or more internal characteristics associated with the natural mother; and the internal physical structures of the maternal manikin simulate some internal characteristics associated with the natural mother, and the internal virtual structures of the virtual maternal anatomy simulate other internal characteristics associated with the natural mother. In some embodiments, the virtual anatomic model further includes virtual maternal anatomy, the virtual maternal anatomy including second external virtual features, and the second external virtual features including virtual representations of one or more external characteristics of the natural mother; and the second external virtual features of the virtual maternal anatomy simulate some external characteristics associated with the natural mother, and the first external physical features of the maternal manikin simulate other external characteristics associated with the natural mother.

It is understood that variations may be made in the foregoing without departing from the scope of the present disclosure.

In several illustrative embodiments, the elements and teachings of the various illustrative embodiments may be combined in whole or in part in some or all of the illustrative embodiments. In addition, one or more of the elements and teachings of the various illustrative embodiments may be omitted, at least in part, and/or combined, at least in part, with one or more of the other elements and teachings of the various illustrative embodiments.

In several illustrative embodiments, while different steps, processes, and procedures are described as appearing as distinct acts, one or more of the steps, one or more of the processes, and/or one or more of the procedures may also be performed in different orders, simultaneously and/or sequentially. In several illustrative embodiments, the steps, processes and/or procedures may be merged into one or more steps, processes and/or procedures.

In several illustrative embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as “left” and right”, “front” and “rear”, “above” and “below” and the like are used as words of convenience to provide reference points and are not to be construed as limiting terms.

In this specification, the word “comprising” is to be understood in its “open” sense, that is, in the sense of “including”, and thus not limited to its “closed” sense, that is the sense of “consisting only of”. A corresponding meaning is to be attributed to the corresponding words “comprise”, “comprised” and “comprises” where they appear.

Although several illustrative embodiments have been described in detail above, the embodiments described are illustrative only and are not limiting, and those skilled in the art will readily appreciate that many other modifications, changes and/or substitutions are possible in the illustrative embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word “means” together with an associated function.

What is claimed is:

1. A method, comprising:

tracking a first manikin while the first manikin moves relative to a second manikin in which the first manikin is contained, wherein the first manikin comprises a fetal manikin, and wherein the second manikin comprises a maternal manikin;

co-registering virtual human anatomy with the fetal manikin, wherein the virtual human anatomy comprises virtual fetal anatomy, and wherein the co-registering of the virtual fetal anatomy with the fetal manikin is based on the tracking of the fetal manikin; and displaying the virtual fetal anatomy on a display unit in a manner that visualizes the virtual fetal anatomy relative to the maternal manikin, wherein the displaying of the virtual fetal anatomy on the display unit is visually synchronized with:

(i) changes to a simulated vital sign of the fetal manikin, causing visually perceptible movement of, and/or deflections to, the virtual fetal anatomy on the display unit; or (ii) external physical pressure applied to the maternal manikin, causing visually perceptible movement of, and/or deflections to, the virtual fetal anatomy on the display unit; or (iii) both (i) and (ii).

2. The method of claim 1, wherein the tracking of the fetal manikin comprises tracking a position and an orientation of the fetal manikin.

3. The method of claim 1, further comprising:

tracking the display unit, wherein the displaying of the virtual fetal anatomy on the display unit is based on the co-registering of the virtual fetal anatomy with the fetal manikin and the tracking of the display unit.

4. The method of claim 3, wherein the tracking of the display unit comprises tracking a position and an orientation of the display unit.

5. The method of claim 3, further comprising:

co-registering additional virtual human anatomy with the maternal manikin; and displaying the additional virtual human anatomy on the display unit in a manner that visualizes the additional virtual human anatomy relative to the maternal manikin;

wherein the displaying of the additional virtual human anatomy on the display unit is based on the co-registering of the additional virtual human anatomy with the maternal manikin and the tracking of the display unit.

6. The method of claim 5, wherein the additional virtual human anatomy comprises virtual maternal anatomy.

7. A system, comprising:

a first manikin, wherein the first manikin comprises a fetal manikin;

a second manikin in which the fetal manikin is contained, wherein the second manikin comprises a maternal manikin;

a display unit that displays virtual human anatomy in a manner that visualizes the virtual human anatomy relative to the maternal manikin, wherein the virtual human anatomy comprises virtual fetal anatomy, and wherein the displaying of the virtual fetal anatomy on the display unit is visually synchronized with:

(i) changes to a simulated vital sign of the first fetal manikin, causing visually perceptible movement of, and/or deflections to, the virtual fetal anatomy on the display unit; or (ii) external physical pressure applied to the maternal manikin, causing visually perceptible movement of, and/or deflections to, the virtual fetal anatomy on the display unit; or (iii) both (i) and (ii);

a tracking system that tracks the fetal manikin while the first fetal manikin moves relative to the maternal manikin; and a computing device that co-registers the virtual fetal anatomy with the fetal manikin, wherein the computing device co-registers the virtual fetal anatomy with the fetal manikin based on the tracking of the fetal manikin by the tracking system.

8. The system of claim 7, wherein the tracking system tracks the fetal manikin by tracking a position and an orientation of the fetal manikin.

9. The system of claim 7, wherein the tracking system also tracks the display unit; and wherein the display unit displays the virtual fetal anatomy, in the manner that visualizes the virtual fetal anatomy relative to the maternal manikin, based on:

the co-registering, by the computing device, of the virtual fetal anatomy with the fetal manikin; and the tracking, by the tracking system, of the display unit.

10. The system of claim 9, wherein the tracking system tracks the display unit by tracking a position and an orientation of the display unit.

11. The system of claim 9, wherein the computing device co-registers additional virtual human anatomy with the maternal manikin;

wherein the display unit displays the additional virtual human anatomy in a manner that visualizes the additional virtual human anatomy relative to the maternal manikin; and wherein the display unit displays the additional virtual human anatomy based on:

the co-registering, by the computing device, of the additional virtual human anatomy with the maternal manikin; and the tracking, by the tracking system, of the display unit.

12. The system of claim 11, wherein the additional virtual human anatomy comprises virtual maternal anatomy.

13. An apparatus, comprising:

a non-transitory computer readable medium; and a plurality of instructions stored on the non-transitory computer readable medium and executable by one or more processors to implement the following steps:

tracking a first manikin while the first manikin moves relative to a second manikin in which the first manikin is contained, wherein the first manikin comprises a fetal manikin, and wherein the second manikin comprises a maternal manikin;

co-registering virtual human anatomy with the fetal manikin, wherein the virtual human anatomy comprises virtual fetal anatomy, and wherein the co-registering of the virtual fetal anatomy with the fetal manikin is based on the tracking of the fetal manikin; and displaying the virtual fetal anatomy on a display unit in a manner that visualizes the virtual fetal anatomy relative to the maternal manikin, wherein the displaying of the virtual fetal anatomy on the display unit is visually synchronized with:

(i) changes to a simulated vital sign of the fetal manikin, causing visually perceptible movement of, and/or deflections to, the virtual fetal anatomy on the display unit; or (ii) external physical pressure applied to the maternal manikin, causing visually perceptible movement of, and/or deflections to, the virtual fetal anatomy on the display unit; or (iii) both (i) and (ii).

14. The apparatus of claim 13, wherein the tracking of the first fetal manikin comprises tracking a position and an orientation of the first fetal manikin.

15. The apparatus of claim 13, wherein:

the plurality of instructions stored on the non-transitory computer readable medium are executable by the one or more processors to implement the following additional step:

tracking the display unit; and the displaying of the virtual fetal anatomy on the display unit is based on the co-registering of the virtual fetal anatomy with the fetal manikin and the tracking of the display unit.

16. The apparatus of claim 15, wherein the tracking of the display unit comprises tracking a position and an orientation of the display unit.

17. The apparatus of claim 15, wherein:

the plurality of instructions stored on the non-transitory computer readable medium are executable by the one or more processors to implement the following additional steps:

co-registering additional virtual human anatomy with the maternal manikin; and displaying the additional virtual human anatomy on the display unit in a manner that visualizes the additional virtual human anatomy relative to the maternal manikin; and the displaying of the additional virtual human anatomy on the display unit is based on the co-registering of the additional virtual human anatomy with the maternal manikin and the tracking of the display unit.

18. The apparatus of claim 17, wherein:

the additional virtual human anatomy comprises virtual maternal anatomy.

19. The method of claim 6, wherein the displaying of the virtual maternal anatomy on the display unit is visually synchronized with:

(iv) changes to the simulated vital sign, or another simulated vital sign, of the fetal manikin, causing visually perceptible movement of, and/or deflections to, the virtual maternal anatomy on the display unit; or (v) the external physical pressure, or another external physical pressure, applied to the maternal manikin, causing visually perceptible movement of, and/or deflections to, the virtual maternal anatomy on the display unit; or (vi) both (iv) and (v).

20. The system of claim 12, wherein the displaying of the virtual maternal anatomy on the display unit is visually synchronized with:

(iv) changes to the simulated vital sign, or another simulated vital sign, of the fetal manikin, causing visually perceptible movement of, and/or deflections to, the virtual maternal anatomy on the display unit; or (v) the external physical pressure, or another external physical pressure, applied to the maternal manikin, causing visually perceptible movement of, and/or deflections to, the virtual maternal anatomy on the display unit; or (vi) both (iv) and (v).

21. The apparatus of claim 18, wherein the displaying of the virtual maternal anatomy on the display unit is visually synchronized with:

(iv) changes to the simulated vital sign, or another simulated vital sign, of the fetal manikin, causing visually perceptible movement of, and/or deflections to, the virtual maternal anatomy on the display unit; or (v) the external physical pressure, or another external physical pressure, applied to the maternal manikin, causing visually perceptible movement of, and/or deflections to, the virtual maternal anatomy on the display unit; or (vi) both (iv) and (v).

* * * * *